US010648360B1

(12) United States Patent
Musil et al.

(10) Patent No.: US 10,648,360 B1
(45) Date of Patent: May 12, 2020

(54) TURBOCHARGER TURBINE ASSEMBLY

(71) Applicant: Garrett Transportation I Inc., Torrance, CA (US)

(72) Inventors: Jan Musil, Brno (CZ); Jakub Fajt, Brno (CZ); Jan Kohoutek, Brno (CZ); Jan Machalinek, Kyjov (CZ)

(73) Assignee: Garrett Transportation I Inc., Torrance, CA (US)

(*) Notice: Subject to any disclaimer, the term of this patent is extended or adjusted under 35 U.S.C. 154(b) by 0 days.

(21) Appl. No.: 16/140,668

(22) Filed: Sep. 25, 2018

(51) Int. Cl.
*F01D 17/16* (2006.01)
*F02B 37/24* (2006.01)
*F02B 37/22* (2006.01)
*F01D 25/16* (2006.01)
*F01D 25/24* (2006.01)
*F02C 6/12* (2006.01)
*F02B 37/18* (2006.01)

(52) U.S. Cl.
CPC ............ *F01D 17/162* (2013.01); *F01D 17/16* (2013.01); *F01D 17/165* (2013.01); *F01D 25/16* (2013.01); *F01D 25/243* (2013.01); *F02B 37/183* (2013.01); *F02B 37/225* (2013.01); *F02B 37/24* (2013.01); *F02C 6/12* (2013.01); *F05D 2220/40* (2013.01)

(58) Field of Classification Search
CPC ...... F01D 17/162; F01D 17/165; F01D 17/16; F01D 25/243; F01D 25/16; F02B 37/225; F02B 37/24; F02B 37/183; F02C 6/12; F05D 2220/40

USPC .................. 60/602, 605.2; 417/380; 415/164
See application file for complete search history.

(56) References Cited

U.S. PATENT DOCUMENTS

| | | | | |
|---|---|---|---|---|
| 6,951,450 B1* | 10/2005 | Figura | ..................... | F01D 9/026 415/164 |
| 7,478,991 B2* | 1/2009 | Noelle | .................. | F01D 17/165 415/159 |
| 8,177,491 B2* | 5/2012 | Noelle | .................. | F04D 29/462 415/164 |
| 2016/0169234 A1* | 6/2016 | Gerard | ..................... | F04D 17/10 415/204 |
| 2017/0145912 A1* | 5/2017 | Micanek | ............... | F01D 17/165 |

* cited by examiner

*Primary Examiner* — Hoang M Nguyen
(74) *Attorney, Agent, or Firm* — Brian J. Pangrle

(57) ABSTRACT

A turbocharger can include a center housing; a bearing disposed in a through bore of the center housing where the through bore of the center housing defines a longitudinal axis; a shaft rotatably supported by the bearing; a compressor wheel operatively coupled to the shaft; a turbine wheel operatively coupled to the shaft; and a turbine housing assembly operatively coupled to the center housing where the turbine housing assembly includes: a turbine housing; and a cartridge that includes a nozzle wall component and a plate component that are spaced axially by spacers, where the nozzle wall component includes spacer bores for the spacers and where the nozzle wall component has a non-circular outer perimeter defined at least in part by arcs where adjacent arcs intersect at intersection points, and where each of the intersection points is radially outwardly from a respective one of the spacer bores.

16 Claims, 17 Drawing Sheets

TURBOCHARGER TURBINE ASSEMBLY

TECHNICAL FIELD

Subject matter disclosed herein relates generally to turbochargers for internal combustion engines.

BACKGROUND

Exhaust driven turbochargers include a rotating group that includes a turbine wheel and a compressor wheel that are connected to one another by a shaft. The shaft is typically rotatably supported within a center housing by one or more bearings. During operation, exhaust from an internal combustion engine drives a turbochargers turbine wheel, which, in turn, drives the compressor wheel to boost charge air to the internal combustion engine.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
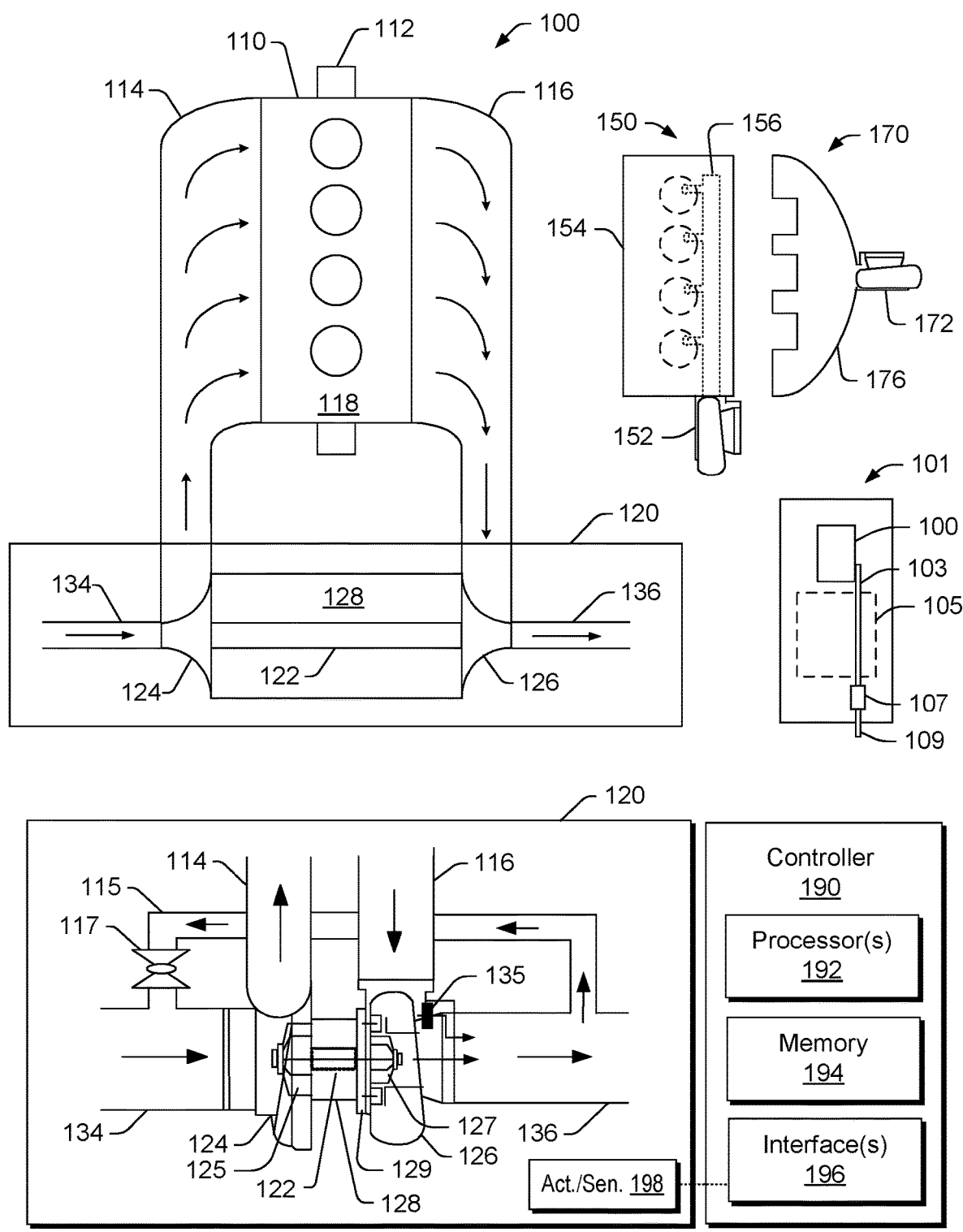
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
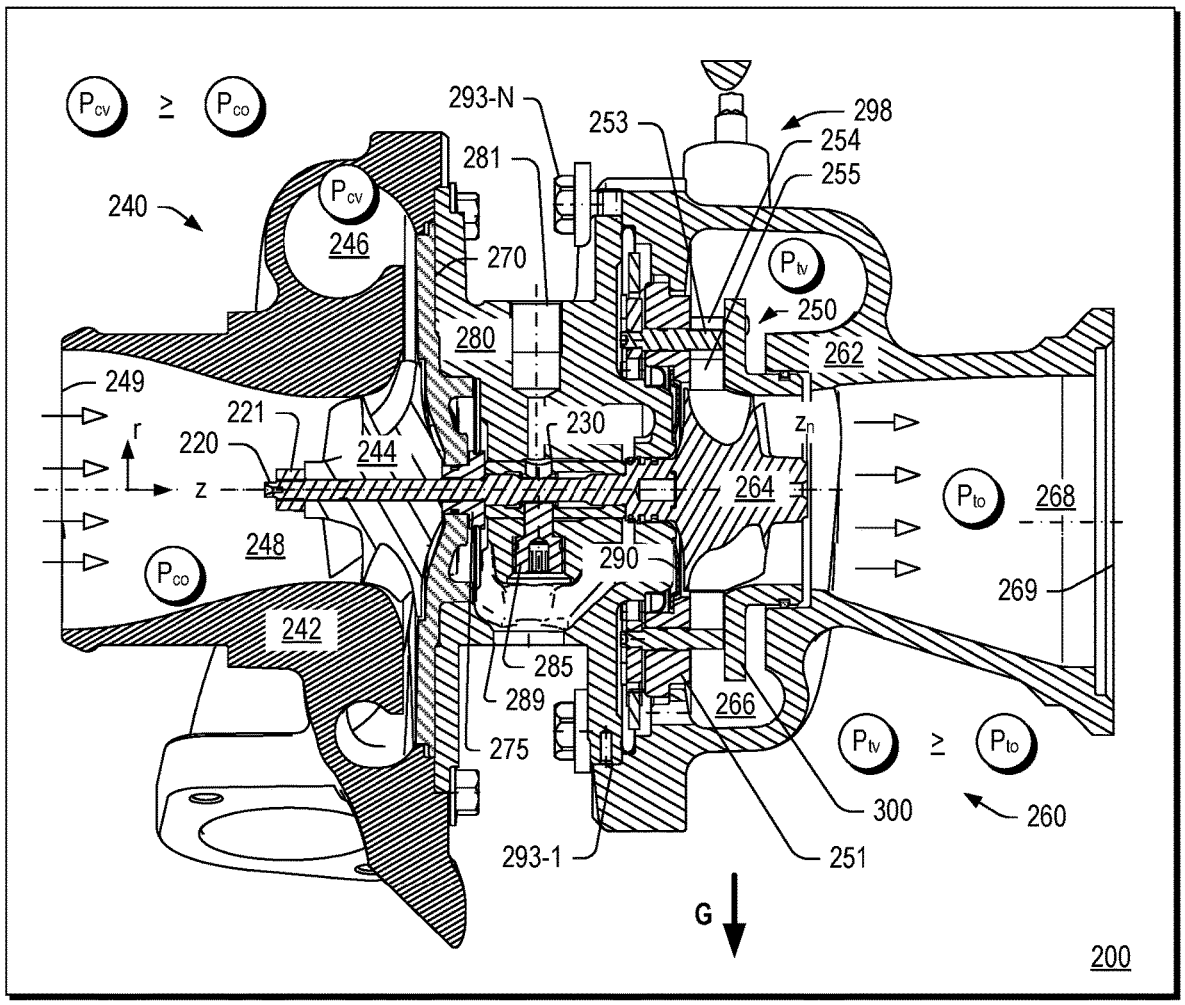
FIG. 2 is a cutaway view of an example of a turbocharger.

FIG. 2 shows an example of a turbocharger assembly 200 that includes a shaft 220 supported by a bearing 230 (e.g., a journal bearing, a bearing assembly such as a rolling element bearing with an outer race, etc.) disposed in a bore (e.g., a through bore defined by one or more bore walls) of a housing 280 between a compressor assembly 240 that defines a compressor side (left) and a turbine assembly 260 that defines a turbine side (right). The compressor assembly 240 includes a compressor housing 242 that defines a volute 246 and that houses a compressor wheel 244. As shown in FIG. 2, the turbine assembly 260 includes a turbine housing 262 that defines a volute 266 and that houses a turbine wheel 264. The turbine wheel 264 may be, for example, welded or otherwise attached to the shaft 220 to form a shaft and wheel assembly (SWA) where a free end of the shaft 220 allows for attachment of the compressor wheel 244.

As an example, a wheel, whether a turbine wheel or a compressor wheel, can include an inducer portion and an exducer portion, for example, characterized in part by an inducer radius ($r_i$) and an exducer radius ($r_e$). As an example, an individual blade can include an inducer edge (e.g., a leading edge) and an exducer edge (e.g., a trailing edge). A wheel may be defined in part by a trim value that characterizes a relationship between inducer and exducer portions.

For a compressor wheel, the inducer portion can be characterized by a "minor" diameter; whereas, for a turbine wheel, the inducer portion can be characterized by a "major" diameter. During operation, inlet flow to a compressor wheel or a turbine wheel occurs with respect to its inducer portion and outlet flow from a compressor wheel or a turbine wheel occurs with respect to its exducer portion.

As to air flow, during operation of the turbocharger 200, air can be directed from the compressor wheel 244 to the volute 246 via a diffuser section defined in part by the compressor housing 242 and a compressor side plate 270 as the compressor wheel 244 rotates, drawing air into a passage 248 via an inlet 249, both of which may be defined by the compressor housing 242. As indicated in FIG. 2, during operation of the turbocharger 200, the compressor wheel 244 acts to boost air pressure such that air pressure in the volute 246 ($P_{cv}$) is greater than air pressure in the passage 248 ($P_{co}$). Rotation of the compressor wheel 244 can generate a negative pressure that acts to "suck" air into the compressor assembly 240 and to direct such air to the volute 246 via the diffuser section. As an example, where exhaust gas recirculation (EGR) is implemented, environmental air may be mixed with exhaust (e.g., upstream and/or downstream of the compressor wheel 244).

In the example of FIG. 2, an axial locating pin 285 is received in an opening of the bearing 230, which may be a cross-bore of the bearing 230. As an example, one or more other types of axial locating mechanisms may be included in a turbocharger that act to limit axial movement of a bearing (e.g., and/or movement in one or more other directions). As an example, a locating pin may allow for radial movement of a bearing, which may allow for effective operation of one or more lubricant films disposed about a surface of the bearing.

In the example of FIG. 2, the shaft 220 includes a step (e.g., a shoulder) that forms an axial annular face. In the example of FIG. 2, a thrust collar 275 (e.g., a type of collar) includes a surface that is seated against the axial annular face of the shaft 220. In such an example, a lock nut 221 can include threads that match threads of an end portion of the shaft 220 such that tightening of the lock nut 221 with respect to the shaft 220 loads the compressor wheel 244 and the thrust collar 275 against the axial annular face of the shaft 220, which can place the shaft 220 (e.g., from the step to its end portion) in tension. In such an example, the shaft 220, the compressor wheel 244 and the lock nut 221 can rotate as a unit (e.g., responsive to exhaust driving the turbine wheel 264). As shown in the example of FIG. 2, the compressor side plate 270 can include a bore (e.g., an opening) in which at least a portion of the thrust collar 275 is positioned where the thrust collar 275 (and/or the compressor side plate 270) can include a groove or grooves that may seat a seal element or seal elements (e.g., O-rings, piston rings, etc.).

In the example of FIG. 2, the turbine assembly 260 includes a variable geometry assembly 250, which may be referred to as a "cartridge" (e.g., the cartridge 250), that may be positioned using an plate component 251, which may be referred to as a flange (e.g., optionally shaped as a stepped annular disc or annular plate), of the cartridge 250 that clamps between the housing 280 and the turbine housing 262, for example, using bolts 293-1 to 293-N and a heat shield 290 (e.g., optionally shaped as a stepped annular disc), the latter of which is disposed between the cartridge 250 and the housing 280 and may be resilient in that it can apply a biasing force. As shown in the example of FIG. 2, the cartridge 250 includes a nozzle wall component 300 and the plate component 251. As an example, one or more mounts or spacers 254 may be disposed between the nozzle wall component 300 and the plate component 251 (e.g., or annular plate component), for example, to axially space the nozzle wall component 300 and the plate component 251 (e.g., forming a nozzle space).

As an example, vanes 255 may be positioned between the nozzle wall component 300 and the plate component 251, for example, where a control mechanism may cause pivoting of the vanes 255. As an example, the vane 255 may include a vane post 253 that extends axially to operatively couple to a control mechanism, for example, for pivoting of the vane 255 about a pivot axis defined by the vane post 253.

As to exhaust flow, during operation of the turbocharger 200, higher pressure exhaust in the volute 266 passes through passages (e.g., a nozzle or nozzles, a throat or throats, etc.) of the cartridge 250 to reach the turbine wheel 264 as disposed in a turbine wheel space defined at least in part by the cartridge 250 and at least in part by the turbine housing 262. After passing through the turbine wheel space, exhaust travels axially outwardly along a passage 268 defined by a wall of the turbine housing 262 that also defines an opening 269 (e.g., an exhaust outlet). As indicated, during operation of the turbocharger 200, exhaust pressure in the volute 266 ($P_{tv}$) is greater than exhaust pressure in the passage 268 ($P_{to}$).

As an example, exhaust pressure in the turbine assembly 260 can depend on position or positioning of the vanes 255. For example, closing and/or opening of the vanes 255 (e.g., narrowing or widening throats) can effect exhaust gas pressure at one or more locations.

While FIG. 2 shows a general direction of gravity (G, Earth's gravity), the orientation of the turbocharger 200 may be in an orientation in an engine compartment that is suitable for operation given particulars of lubricant feed, flow and drainage.

As an example, a turbine assembly of an exhaust gas turbocharger can include vanes as part of a variable geometry turbine (VGT) or variable nozzle turbine (VNT). Vanes may be disposed at least in part in a cartridge where the cartridge is disposed between a turbine housing and a center housing of a turbocharger.

As an example, a cartridge may include a nozzle wall component and an plate component spaced axially by mounts (e.g., spacers) where vanes are accommodated to control exhaust flow from a volute to a turbine wheel space. As an example, a vane may include a trailing edge and a leading edge with a pressure side airfoil and a suction side airfoil that meet at the trailing edge and the leading edge. Such a vane may have a planar upper surface and a planar lower surface where a clearance exists between the planar upper surface and the nozzle wall component (e.g., between a lower planar surface of an annular portion of the nozzle wall component) and/or where a clearance exists between the planar lower surface and the plate component (e.g., between an upper planar surface of an annular portion of the plate component).

As an example, each vane may include an axis about which the vane may pivot (e.g., a pivot axis). As an example, each vane may include a post (e.g., or axle) that defines a pivot axis. As an example, a post may be integral with a vane (e.g., cast as a single piece of metal, alloy, etc.) or a post may be a separate component that can be operatively coupled to a vane.

As an example, movement of a vane (e.g., arcwise) may be less closer to the pivot axis and greater further away from the pivot axis. For example, a trailing edge or a leading edge may be disposed a distance from the pivot axis such that upon pivoting of a vane, the leading edge and/or the trailing edge sweeps a maximum arc of the vane for a desired amount of pivoting. If clearance between an upper surface of a vane and a lower surface of a nozzle wall component is diminished, the vane may bind, where the risk may increase depending on arc length as interaction area can increase with respect to arc length. In such an example, deformation to a nozzle wall component may cause a vane or vanes to bind upon pivoting or even in a static position. Binding can result in loss of control, stress to a control mechanism, wear, etc.

As an example, forces acting on a vane and/or a post of a vane may cause a vane or vanes to bind upon pivoting or even in a static position. Binding can result in loss of control, stress to a control mechanism, wear, etc.

As to pressure differentials and temperatures in a variable geometry turbine assembly, as an example, exhaust in a volute may have pressure in a range of approximately 120 kPa to approximately 400 kPa and possible peak pressure of up to approximately 650 kPa (absolute) and, for example, temperature in a range of approximately 150 degrees C. to approximately 980 degrees C.; whereas, at a location axially downstream of a turbine wheel, exhaust may have pressure in a lower range and temperature in a lower range. Exhaust gas temperatures in a gasoline fuel internal combustion engine may exceed those of a diesel fuel internal combustion engine. Where a variable geometry turbine assembly is utilized with a gasoline fuel internal combustion engine, the environment may be harsher in terms of temperature when compared to a diesel fuel internal combustion engine.

As an example, one or more components of a variable geometry turbine assembly (e.g., VGT assembly or variable nozzle turbine (VNT) assembly) can include at least a portion made of a material that can withstand pressures and temperatures in the aforementioned ranges. For example, a material can be the INCONEL® 718 alloy (Specialty Materials Corporation, New Hartford, N.Y.). Some other examples of materials include INCONEL® 625, C263 (aluminum-titanium age hardening nickel), René 41 (nickel-based alloy), WASPALOY® alloy (age hardened austenitic nickel-based alloy, United Technologies Corporation, Hartford, Conn.), etc.

As an example, a cartridge can include vanes that are disposed at least in part between two components. As an example, at least a portion of a vane may be made of a material such as HK30, which is a chromium-nickel-iron stainless steel alloy including approximately 30% chromium and 20% nickel, with the balance being predominantly iron (percentages by mass). As an example, at least a portion of a vane may be made of a HK series stainless steel alloy that includes about 18-22% nickel by mass. Such an alloy can be fully austenitic. As an example, one or more components of a cartridge may be made of a material such as, for example, PL23 alloy or SS310 alloy.

As an example, an exhaust gas variable geometry turbine assembly can include a number of pivotable vanes that define, at least in part, throats within an exhaust gas nozzle where each of the pivotable vanes includes a corresponding post.

Figure 3A:
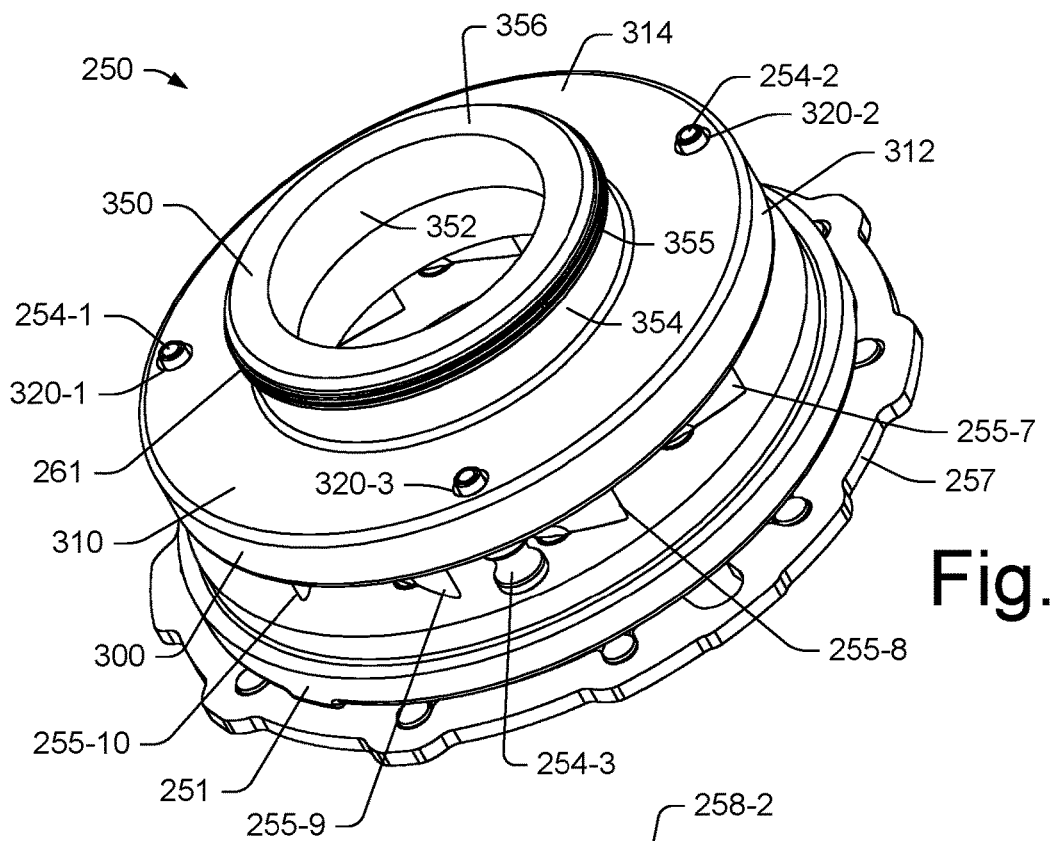
FIGS. 3A and 3B are perspective views of an example of a cartridge of a turbocharger.
Figure 3B:
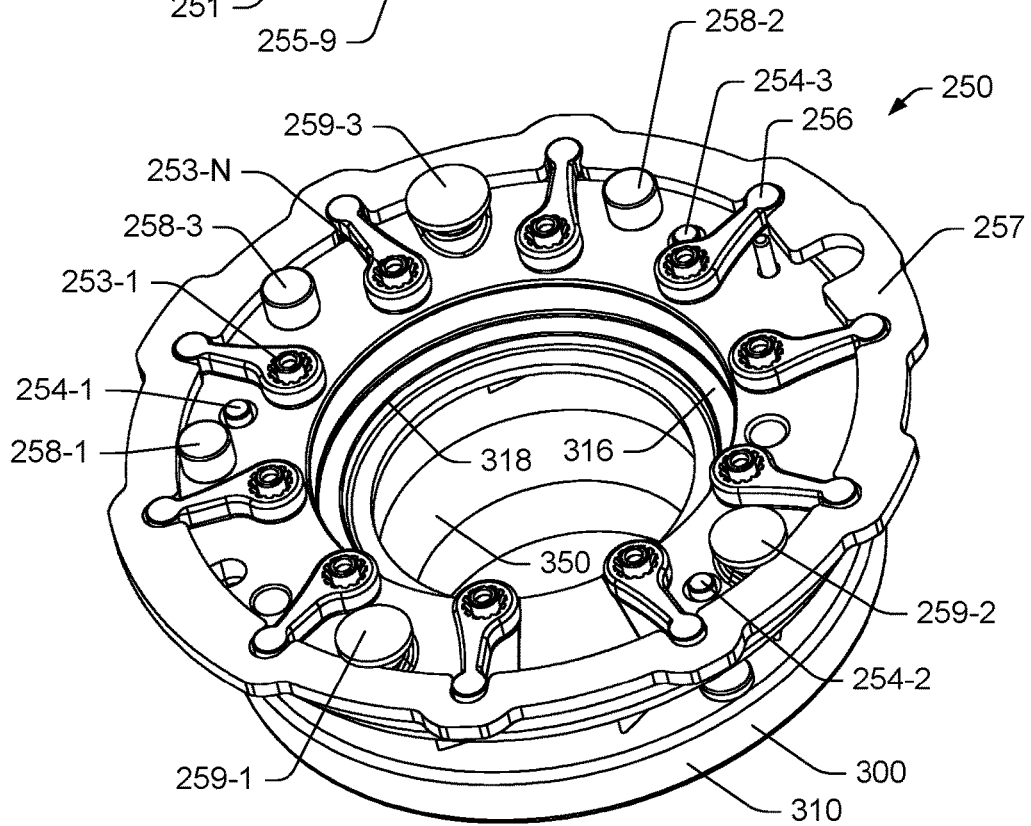

FIGS. 3A and 3B show perspective views of the example cartridge 250 of FIG. 2. In FIGS. 3A and 3B, the nozzle wall component 300 includes at least an annular plate portion 310 and can include a cylindrical pipe portion 350. Where the nozzle wall component 300 includes the cylindrical pipe portion 350, the overall shape of the nozzle wall component 300 can be referred to as a hat shape. As shown, the annular plate portion 310 includes an outer perimeter defined by an outer surface 312 where the outer perimeter is circular. The outer surface 312 can be seen as a cylindrical surface that meets opposing annular surfaces 314 and 316 where the annular surface 316 includes a shroud portion 318 as a shroud of a turbine wheel space for a turbine wheel where a clearance exists between the shroud portion 318 and a suitable turbine wheel disposed in the turbine wheel space. As shown, the nozzle wall component 300 includes a plurality of bores 320-1, 320-2 and 320-3 (e.g., spacer bores), which receive a plurality of spacers 254-1, 254-2 and 254-3, which space the nozzle wall component 300 axially with respect to the plate component 251. The bores 320-1, 320-2 and 320-3 are shown as being cylindrical and extending between the opposing surfaces 314 and 316 of the nozzle wall component 300 where the bores 320-1, 320-2 and 320-3 each has a diameter and an axial length along a bore axis where the bore axes are at a radius of an axis defined by the turbine wheel space, for example, as defined by the shroud portion 318, which may be referred to as a rotational axis (e.g., an intended rotational axis of a turbine wheel disposed in the turbine wheel space). In the example of FIGS. 3A and 3B, a circle with a diameter centered on the rotational axis will pass through the bore axes of the bores 320-1, 320-2 and 320-3, for the nozzle wall component 300 as manufactured, which may be considered an assembled state that is prior to use of the cartridge 250 in a turbocharger installed in an engine compartment of an internal combustion engine. As discussed further below, the nozzle wall component 300 can be subjected to various conditions (e.g., forces, temperatures, pressures, etc.), which can impact the nozzle wall component 300 (e.g., as to integrity, shape, etc.).

As to the cylindrical pipe portion 350, it includes an inner surface 352 and an outer surface 354, as well as an end surface 356. The cylindrical pipe portion 350 can be defined at least in part by an inner diameter, an outer diameter and an axial length, for example, as measured along the rotational axis. In the example shown, the outer surface 354 includes one or more grooves 355 that can receive one or more seal elements (e.g., seal components such as or akin to piston rings). In the example shown, the surface 314 and the surface 354 meet and form a shoulder that has an angle of approximately 90 degrees. As to the surface 316 and the surface 352, they meet at respective ends of the shroud portion 318. For example, the surface 316 can be substantially flat, meet the shroud portion 318, which is contoured, which then meets the surface 352, which extend axially to the end surface 356. As shown, the end surface 356 is an annular surface the meets the inner surface 352 and the outer surface 354.

The perspective views show one or more seal rings 261 seated in the one or more grooves 355 of the nozzle wall component 300, the plurality of spacers 254-1, 254-2 and 254-3, a plurality of vanes 255 (e.g., 255-1 to 255-N) and corresponding vane posts 253-1 to 253-N, a plurality of vane control arms 256, a unison ring 257, a plurality of pins 258-1, 258-2 and 258-3, and a plurality of guides 259-1, 259-2 and 259-3.

In the example of FIGS. 3A and 3B, the unison ring 257 may be rotated about a central axis (e.g., substantially aligned with the axis of rotation of a turbine wheel) to cause the plurality of vane control arms 256 to rotate about respective post axes of individual vane posts 253 of the plurality of vanes 255. The plurality of pins 258-1, 258-2 and 258-3 and the plurality of guides 259-1, 259-2 and 259-3 may help to align the unison ring 257 with respect to other components of the cartridge 250.

In the example of FIGS. 3A and 3B, one or more ends of the spacers 254-1, 254-2 and 254-3 may be fixed (e.g., riveted, capped, etc.). For example, an end of a spacer may be flattened to a radius that is greater than an opening of a bore through which the spacer extends such that the spacer cannot be moved axially into the bore. As shown, each of the spacers 254-1, 254-2 and 254-3 includes a nozzle portion with a radius and/or a diameter that is greater than a corresponding end portion of opposing end portions that are received by respective spacer bores of the nozzle wall component 300 and the plate component 251. For example, a spacer can be defined by one or more radii and/or one or more diameters as well as one or more axial dimensions such as an axial dimension of a nozzle portion.

The nozzle portion of each of the spacers 254-1, 254-2 and 254-3 can include opposing shoulders where one shoulder abuts the nozzle wall component 300 and the other shoulder abuts the plate component 251 to define a nozzle axial dimension, which can be slightly larger than a vane axial dimension to allow vanes to pivot in the nozzle where a clearance may be defined based at least in part on one or more thermal considerations (e.g., thermal expansion, contraction, etc.).

In the example of FIGS. 3A and 3B, the cartridge 250 may be secured as a cartridge unit via riveting ends of the spacers 254-1, 254-2 and 254-3, which fixes an axial distance between the nozzle wall component 300 and the plate component 251 at a given temperature (e.g., an ambient temperature during assembly). Such a riveting process may introduce some amount of stress at the passages (e.g., bores) of the nozzle wall component 300 and/or the plate component 251 through which the spacers 254-1, 254-2 and 254-3 pass.

Figure 4:
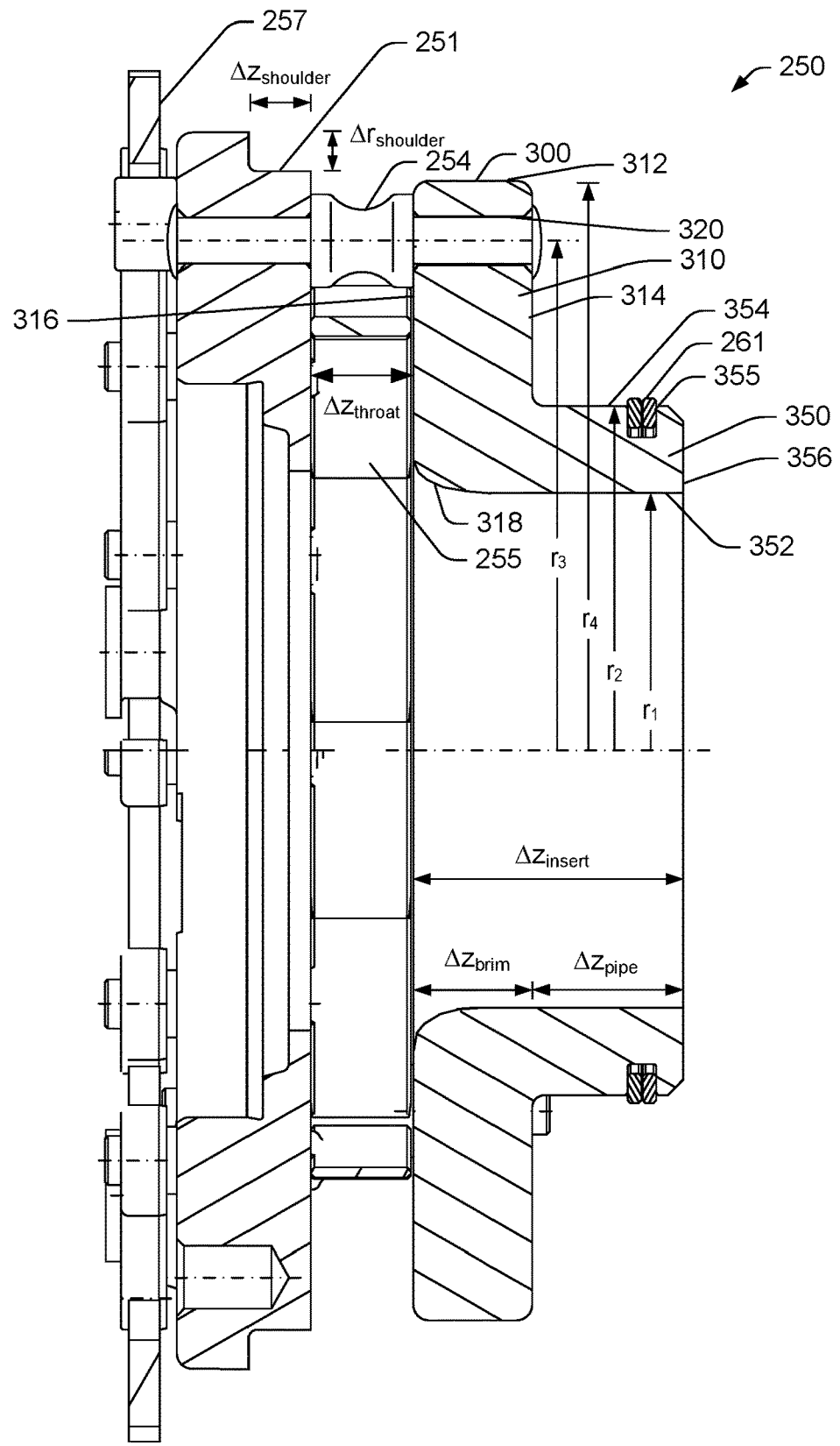
FIG. 4 is a cutaway view of the cartridge of FIGS. 3A and 3B.

FIG. 4 shows a cutaway view of the cartridge 250 of FIGS. 3A and 3B. Various dimensions are shown in FIG. 4 with respect to a cylindrical coordinate system (Θ, r, z) with a central axis z where the cutaway view is a 180 degree view that illustrates cross-sections in the r,z-plane. Radial dimensions include a radius $r_1$ from the central axis z to an inner surface 352 of the cylindrical pipe portion 350 of the nozzle wall component 300 that defines in part a turbine wheel space, a radius $r_2$ from the central axis z to an outer surface 354 of the cylindrical pipe portion 350 of the nozzle wall component 300, a radius $r_3$ from the central axis z to the spacer 254 axis (e.g., parallel to the central z axis), and a radius $r_4$ from the central axis z to an outer perimeter of the annular plate portion 310 of the nozzle wall component 300 at the surface 312 where the annular plate portion 310 of the nozzle wall component 300 includes a portion between $r_2$ and $r_4$ and where the annular plate portion 310 may be referred to as a brim portion.

As mentioned, the nozzle wall component 300 can be shaped substantially as a hat with the cylindrical pipe portion 350 extending axially away from the annular plate portion 310 or brim portion of the nozzle wall component

300. As to a cross-sectional profile, the nozzle wall component 300 has a substantially L-shaped cross-sectional profile as formed by the cylindrical pipe portion 350 and the annular plate portion 310. As shown in the example of FIG. 4, the nozzle wall component 300 is a single piece that can be formed from a single piece of stock material, cast as a single piece, etc.

As an example, the nozzle wall component 300 may be machined to form one or more features. For example, the nozzle wall component 300 may be drilled to form the bores (see, e.g., the bore 320) for axial support and/or positioning of a plurality of spacers (see, e.g., the spacer 254). As shown in FIG. 4, the nozzle wall component 300 can be defined by an axial dimension $\Delta z_{insert}$, which may be a sum of an axial brim dimension $\Delta z_{brim}$ and an axial pipe dimension $\Delta z_{pipe}$.

As shown in FIG. 4, the vane 255 is disposed at least in part between the plate component 251 and the nozzle wall component 300 where an axial distance between the components 251 and 300 may be defined at least in part by the spacer 254.

As shown in FIG. 4, the spacer 254 can include a portion with an axial dimension and a diameter where the diameter is larger than the diameter of a axial extensions of the spacer 254 where one axial extension passes through an opening of a passage (e.g., a bore) in the plate component 251 where it is flared or capped and where another axial extension passes through an opening of the bore 320 in the nozzle wall component 300 where it is flared or capped. In such an example, the axial spacing between the plate component 251 and the nozzle wall component 300 can be fixed to define an axial nozzle dimension, which can be referred to as a throat dimension (see, e.g., $\Delta z_{throat}$).

As mentioned, an exhaust turbine assembly can be exposed to high temperatures. For example, consider a relatively small turbocharger with a variable nozzle cartridge (VNT cartridge) that is specified for use in an internal combustion engine application where a maximum temperature of the VNT cartridge may be in excess of approximately 700 degrees C. and, for example, less than approximately 1000 degrees C. Changes in temperature can cause one or more materials to expand (e.g., according to geometry, size, material of construction, forces, etc.). Depending on types of material(s) used, shapes of components, clearances, tolerances, etc., stresses can occur, particularly with respect to the plate component 251, the nozzle wall component 300 and the spacers 254, which, in turn, may affect one or more clearances of the vanes 255. Where a vane binds (e.g., contacts a surface with a high amount of friction), control of a VNT cartridge (or VGT cartridge) may be effected. Further, vanes may add to stress or stresses of a cartridge.

Referring again to FIG. 2, as mentioned, the heat shield 290 may be resilient in that it may act as a spring. For example, the heat shield 290 can contact the housing 280 and the plate component 251 such that the cartridge 250 is forcibly biased against the housing 262. For example, the housing 262 can include an annular step that includes a stop surface that limits the axial movement of the plate component 251 and hence the cartridge 250. As shown in FIGS. 2, 3 and 4, the plate component 251 includes an annular step or annular shoulder that is at a position radially outward from the spacer 254, which includes the portion that extends through an opening of a passage through the plate component 251 and the portion that extends through an opening of the bore 320 through the nozzle wall component 300. In the example of FIG. 4, an annular shoulder of the plate component 251 is shown to include an axial dimension $\Delta z_{shoulder}$ and a radial dimension $\Delta r_{shoulder}$.

Figure 5:
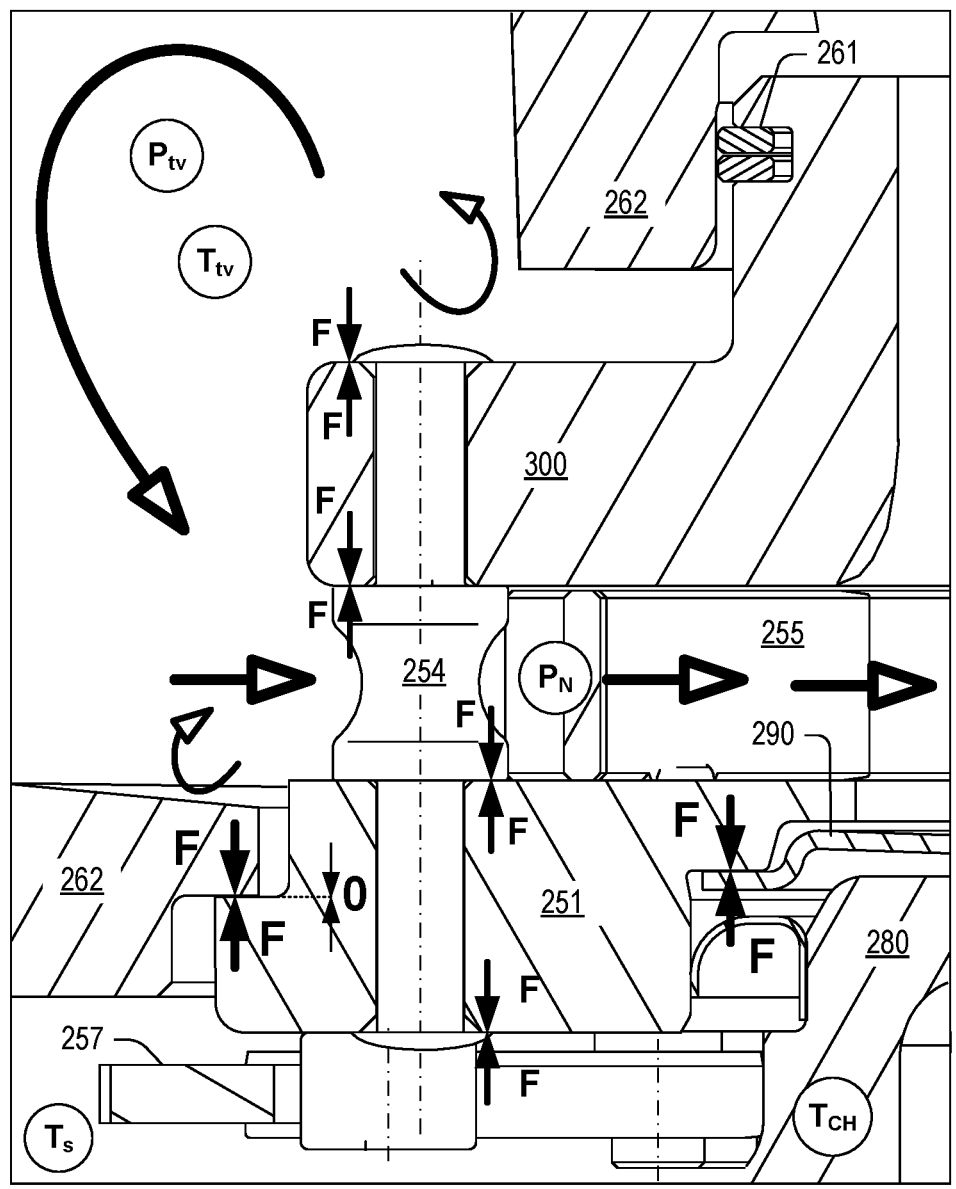
FIG. 5 is a cutaway view of a portion of the turbocharger of FIG. 2 in an operational state.

FIG. 5 shows a portion of the cartridge 250 in spatial relationship with the turbine housing 262 and the center housing 280 along with various operational parameters that represent examples of operational conditions. For example, the turbine volute (tv) includes a volute pressure ($P_{tv}$) and a volute temperature ($T_{tv}$), the throat or nozzle includes a nozzle pressure ($P_N$), the center housing (CH) 280 includes a center housing temperature ($T_{CH}$) and a space that exists between the center housing 280, the turbine housing 262 and the plate component 251 includes a space temperature ($T_s$).

As shown in FIG. 5, exhaust flows in the volute with various rotational cross-sectional flow profiles where the exhaust flows from the volute to the nozzles (e.g., throats) defined by adjacent vanes 255, the nozzle wall component 300 and the plate component 251. Volute shape can influence vortex formation, vortex size, pressure loss, etc. In the example of FIG. 5, the volute can include a main vortex and one or more minor vortexes. Such vortexes may be referred to as secondary flows or secondary flow patterns, which can depend on type of flow to a volute (e.g., pulsating, steady, etc.).

As shown in FIG. 5, the pressure in the volute ($P_{tv}$) is greater than the pressure in the nozzles ($P_N$) where a pressure difference can be defined between the two pressures. As indicated in FIG. 5, the pressure difference is accompanied by a velocity difference (e.g., via Bernoulli's principle) where the nozzle wall component 300 has a higher average velocity on its nozzle facing surface compared to its volute facing surface such that a "lift" force is axially downward in a direction from the nozzle wall component 300 toward the plate component 251. In the approach of FIG. 5, as the spacer 254 (e.g., spacers 254-1, 254-2, and 254-3) fix the axial distance between the nozzle wall component 300 and the plate component 251, the "lift" force does not result in any change in the axial distance. Ignoring temperature effects during operation or non-operation, the axial distance remains the same; noting that temperature changes may result in some amount of change in axial distance due to thermal coefficients of expansion (or contraction), which may be complicated due to the plate component 251 and the nozzle wall component 300 being connected and fixed by the spacers 254-1, 254-2 and 254-3 (e.g., as riveted at ends, etc.). For example, thermal stresses may be generated where such stresses may cause distortions to the nozzle wall component 300 in part because the spacers 254-1, 254-2 and 254-3 are connected to the plate component 251. In such an example, where the nozzle wall component 300 expands the spacers 254-1, 254-2 and 254-3 may hinder such expansion such that stress builds and distorts the nozzle wall component 300. Distortion of the nozzle wall component 300 can affect clearance(s) with respect to a turbine wheel (e.g., consider rotational profile of a turbine wheel), for example, along a contour of a shroud portion. Where clearances change, performance may change, which may change in a detrimental manner. Where a clearance is reduced, a risk exists for contact between a nozzle wall component and a turbine wheel, which may result in catastrophic failure of a turbine wheel and/or turbine housing (e.g., or one or more other components of a turbocharger).

The example of FIG. 5 also shows various force arrows (e.g., approximate force and/or reaction force vectors). As shown, the shoulder of the plate component 251 is in contact with a mating shoulder of the turbine housing 262 such that there is zero clearance and a force and reaction force. Forces can be imposed by the heat shield 290, which may apply a biasing force axially upwardly away from the center housing 280. Forces are also shown with respect to the spacer 254 where various interfaces can exist where the plate component 251 and the nozzle wall component 300 are clamped at least in part by the spacer 254.

Figure 6:
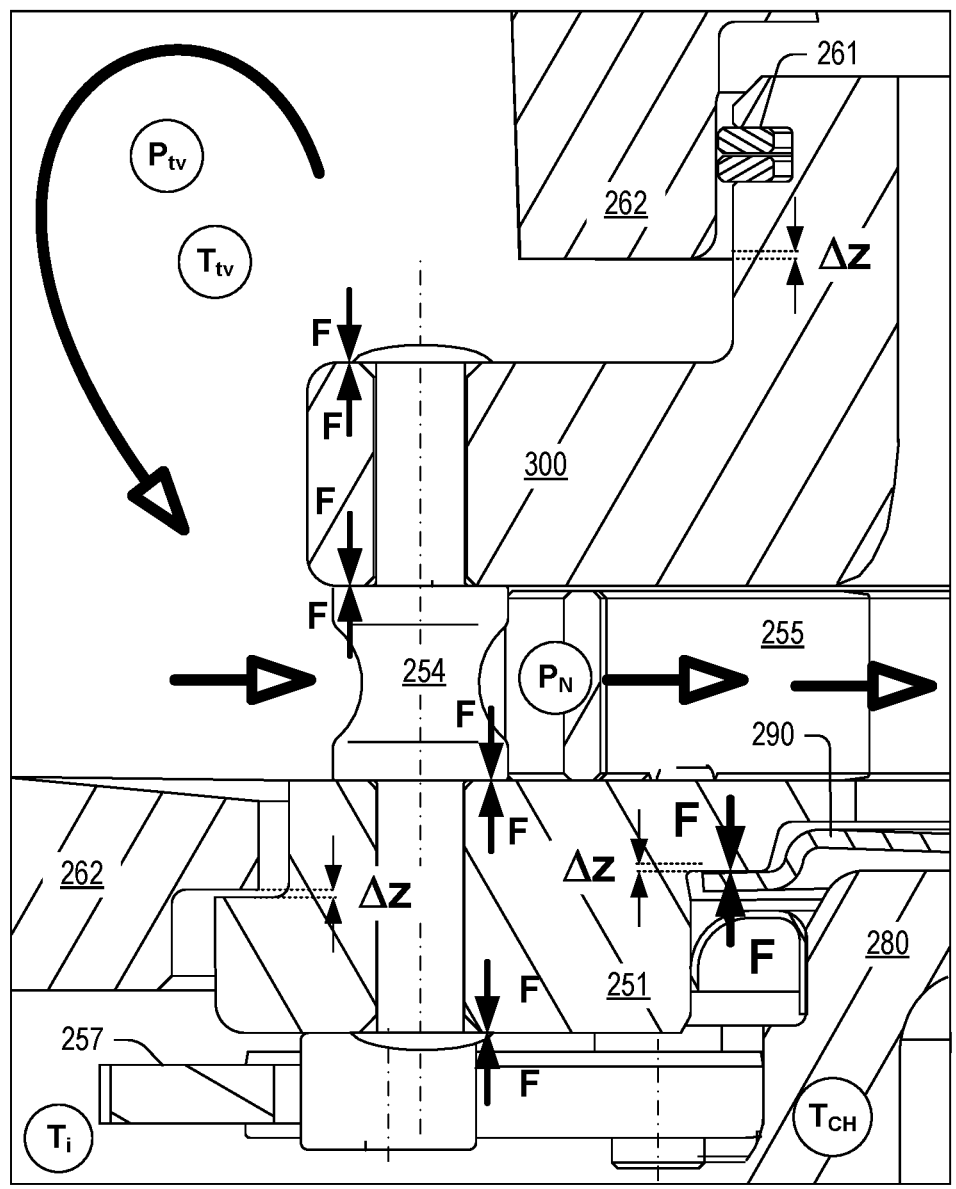
FIG. 6 is a cutaway view of a portion of the turbocharger of FIG. 2 in an operational state.

FIG. 6 shows the assembly of FIG. 5 where the cartridge 250 is displaced axially in comparison to the cartridge 250 of FIG. 5. As shown, the shoulder of the plate component 251 is axially displaced by a distance Δz with respect to the mating shoulder of the turbine housing 262 such that the plate component 251 is not in direct contact with the turbine housing 262. In such an example, the heat shield 290 may apply an increased force that acts to push the cartridge 250 axially upwardly away from the center housing 280. As indicated, the one or more seal rings 261 may slide against a surface of the turbine housing 262 where the cartridge 250 moves axially.

FIGS. 5 and 6 show that the cartridge 250 may move axially while the axial distance between the plate component 251 and the nozzle wall component 300 remains constant (e.g., ignoring temperature effects).

Figure 7:
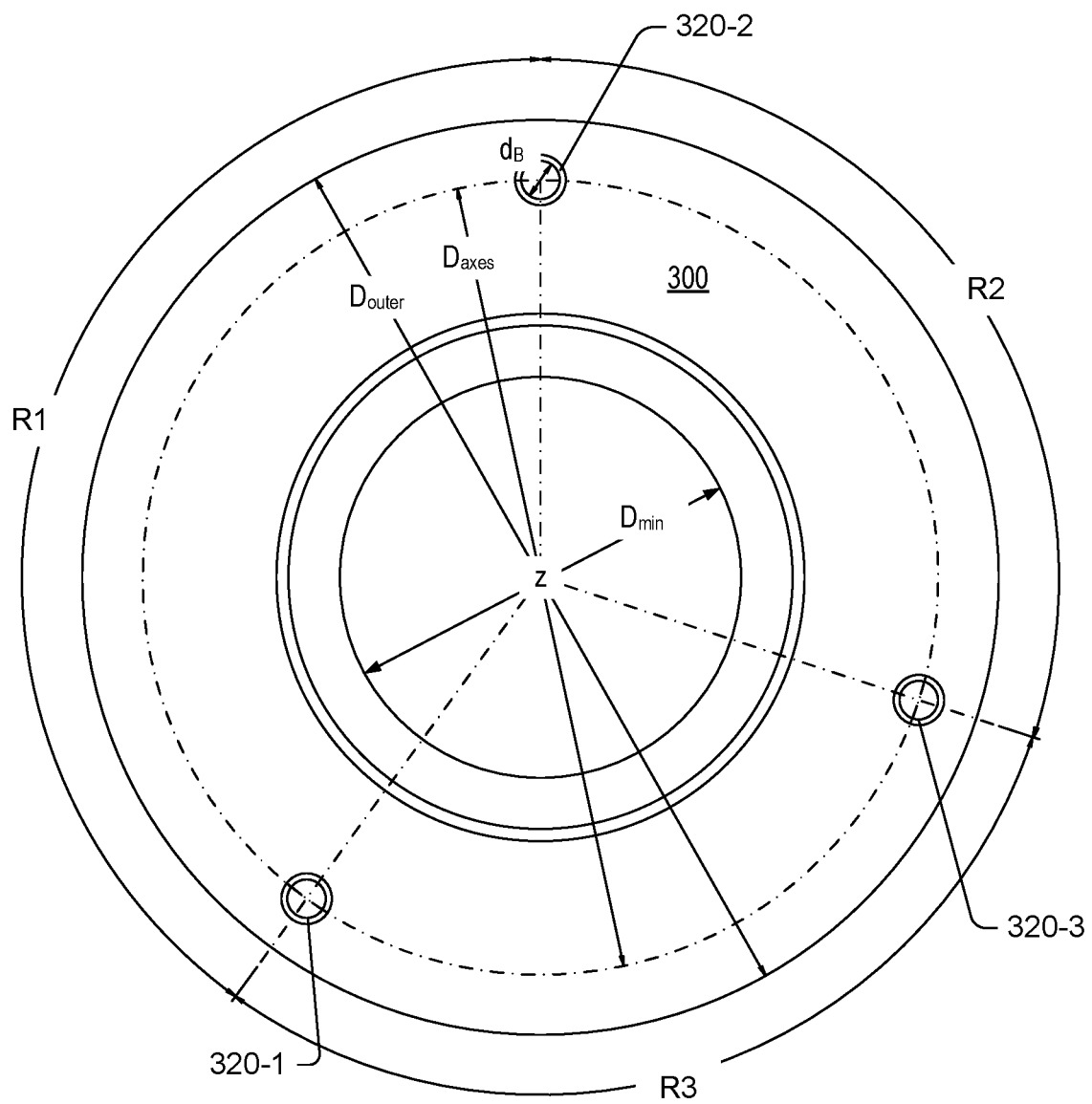
FIG. 7 is a plan view of an example of a nozzle wall component with a circular outer perimeter.

FIG. 7 shows a plan view of the nozzle wall component 300 where the bores 320-1, 320-2 and 320-3 are shown as being spaced by angles about a rotational axis for which a circle with a diameter can be defined. As shown, each of the bores 320-1, 320-2 and 320-3 can be defined by a bore diameter (e.g., $d_B$).

The nozzle wall component 300 can be formed to include the bores 320-1, 320-2, and 320-3 for spacers where each of the bores can include a bore wall thickness that is defined from a wall of the bore (e.g., a bore wall) along a radial line from an axis of the nozzle wall component to a perimeter of the nozzle wall component where the axis can be defined as a z-axis in a cylindrical coordinate system (e.g., r, z and Θ), which can be positioned in an assembled turbine assembly to coincide with an axis of rotation of a turbine wheel about a shaft, which may be operatively coupled to a compressor wheel. The nozzle wall component 300 can be defined in part by an outer diameter of its circular perimeter ($D_{outer}$). Further, axes of the bores can coincide with a diameter of yet another circle with a diameter that may be referred to as a bore axes diameter ($D_{axes}$). As shown in FIG. 7, azimuthal spans R1, R2 and R3 exist between the bore axes of the bores 320-1, 320-2 and 320-3 where the azimuthal span R1 corresponds to bores 320-1 and 320-2, the azimuthal span R2 corresponds to the bores 320-2 and 320-3, and the azimuthal span R3 corresponds to the bores 320-3 and 320-1. FIG. 7 also shows a minimum diameter ($D_{min}$) that can correspond to a minimum shroud diameter or a minimum diameter of the cylindrical pipe portion 350.

Figure 8:
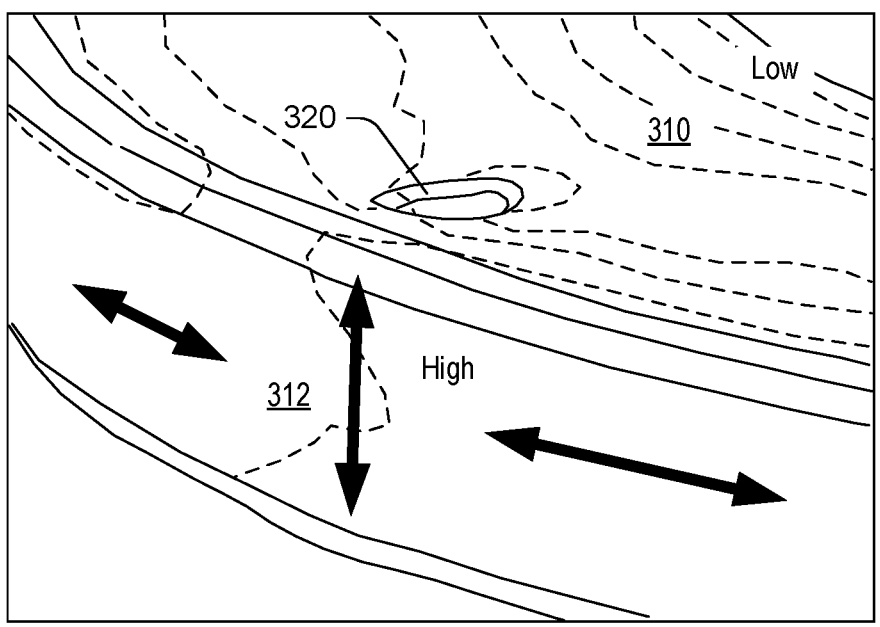
FIG. 8 is a series of perspective views of the nozzle wall component of FIG. 7 with respect to simulated deformations at a spacer bore.
Figure 8:
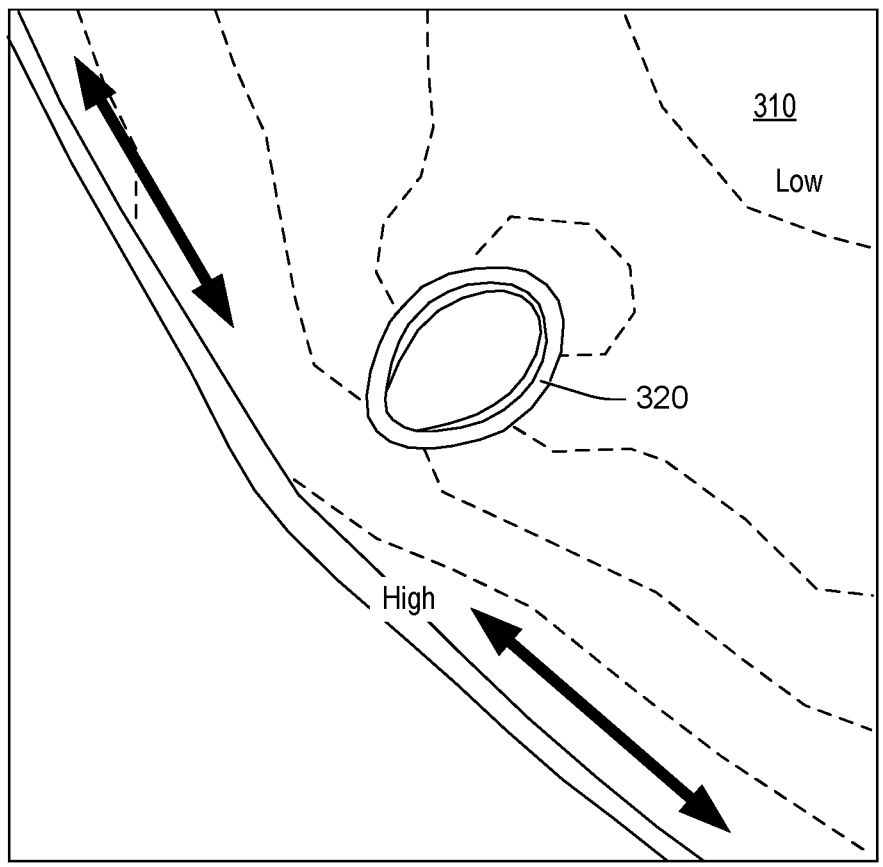

FIG. 8 shows views of the annular plate portion 310 of the nozzle wall component 300 as simulated via a numerical simulation framework (ANSYS simulation software, Ansys, Inc., Canonsburg, Pa., US) for various conditions that can occur during actual operation of a turbocharger that includes the nozzle wall component 300 as part of a turbine assembly. As shown, distortions can occur, which may be plastic such that the nozzle wall component 300 does not recover. As mentioned, distortions to the nozzle wall component 300 can lead to detrimental consequences (e.g., as to vanes, vane clearance, integrity, etc.). In particular, one or more of the bore walls that define the respective one or more bores 320-1, 320-2 and 320-3 may deform and, for example, crack. FIG. 8 shows a single one of the plurality of bores, labeled as the bore 320. Various contours of values are shown, along with general labels as to low and high deformations.

The simulated views of FIG. 8 pertain to effects of temperatures in excess of 900 degrees C. where, in actual operation of the nozzle wall component 300, cracking may occur, which is an integrity issue and a deformation issue. Specifically, a cause of cracking can be associated with the force and deformation that occur at the wall between the bore 320 and the surface 312 at the outer perimeter of the nozzle wall component 300. The views of FIG. 8 show cumulative plastic strain that distorts the annular plate portion 310 of the nozzle wall component 300 in a manner that distorts the bore 320, which, can impact forces with respect to a corresponding spacer, which may further impact one or more other components.

As an example, a nozzle wall component can be formed that includes bores for spacers where each of the bores can include a bore wall thickness that is defined from a wall of the bore (e.g., a bore wall) along a radial line from an axis of the nozzle wall component to a perimeter of the nozzle wall component where the axis can be defined as a z-axis in a cylindrical coordinate system (e.g., r, z and Θ), which can be positioned in an assembled turbine assembly to coincide with an axis of rotation of a turbine wheel about a shaft, which may be operatively coupled to a compressor wheel. In such an example, the nozzle wall component may be inscribed by a circle with a diameter (e.g., an outer diameter) and inscribed by another circle with a different diameter (e.g., an inner diameter). Further, axes of the bores may coincide with a diameter of yet another circle with a diameter that may be referred to as a bore axes diameter, which may be, for example, a diameter that is less than or equal to the inner diameter and hence less than the outer diameter. As an example, the axes of the bores may coincide with a diameter that is greater than the inner diameter yet less than the outer diameter. In a plan view that is in an r, Θ plane, the nozzle wall component can have an outer perimeter that has a maximum or maxima at the outer diameter and that has a minimum or minima at the inner diameter. Accordingly, the area of the nozzle wall component in the plan view can be determined in part by an area that exists between the inner diameter and the outer diameter, which can be greater in the regions proximate to the bores. As an example, a nozzle wall component can include an outer perimeter that can be defined by intersecting curves, which can be intersecting arcs, where intersection points define or approximately define an outer diameter and where a respective intermediate point on each of the curves, collectively, can define an inner diameter; noting that one or more of such diameters may be, as to centroids, slightly offset from a central axis of a nozzle wall component or may be directly on a central axis of a nozzle wall component. As an example, given an inner diameter and an outer diameter, areas lying therein may be shaped with convex outer perimeter sides defined by respective curves and a concave side defined by the inner diameter. As an example, an area between an inner diameter and an outer diameter may include a number of regions that corresponds to a number of spacer bores. For example, for three spacer bores, the area can be composed of three sub-areas (e.g., spacer bore regions).

As an example, where a first nozzle wall component has an outer perimeter defined in part by an outer diameter and an inner diameter and where a second, different nozzle wall component has an outer perimeter defined by an outer diameter that is the same as that of the first nozzle wall component, the area in a plan view of the first nozzle wall component is less than the area of the second nozzle wall component. Further, where thickness (e.g., axial thickness) of the first and second nozzle wall components is the same and where they are made of the same material, the mass of the first nozzle wall component is less than the second nozzle wall component. As to response to thermal cycling, the shape of the first nozzle wall component results in less deformation of bore wall regions than the shape of the second nozzle wall component. Accordingly, as an example, the first nozzle wall component can be of lesser mass (e.g., less material) and perform better with respect to its response to thermal cycling. Such an improved response to thermal cycling can improve integrity of the nozzle wall component, particularly with respect to bores for spacers (e.g., spacer bores). A lesser mass may be optional depending on one or more factors; noting that a lesser mass can result in a lesser mass turbocharger, which can help to reduce vehicle weight where the turbocharger is installed in the vehicle as operatively coupled to an internal combustion engine.

As explained, a nozzle wall component that has an outer perimeter defined by intersecting curves, which may be arcs, the thermal expansion of the nozzle wall component can be limited to be less than a corresponding nozzle wall component that has an outer perimeter defined by a circle.

As to a nozzle wall component with an outer perimeter defined by a circle, the impact of thermal expansion becomes more pronounced with increasing outer diameter in that the larger the outer diameter is, the greater are the compressive stresses in the outer perimeter which has been observed and simulated to lead to undesirable "jamming" of material in a region that includes a wall of a spacer bore (see, e.g., the simulation results of FIG. 8).

By shaping the outer perimeter of a nozzle wall component with intersecting curves, which can be arcs, in comparison to the circular perimeter nozzle wall component, material is effectively removed "between" each spacer bore pair thus reducing thermal expansion and subsequently limiting strains in the material. As an example, at the same time, the wall thickness at the spacer bores may remain the same as for the circular perimeter nozzle wall component (e.g., depending on one or more factors, etc.). As an example, an outer diameter of a nozzle wall component may be determined in part by one or more clearances during assembly and/or in an assembly of components. As an example, where the outer diameter is set to a maximum, the nozzle wall component with the intersecting curves outer perimeter will exhibit less thermal expansion as to walls of spacer bores when compared to the nozzle wall component with the circular outer perimeter. In such an approach, removing and/or reducing material of a nozzle wall component can help to reduce the thermal expansion of its outer perimeter and thereby help to limit thermally induced strains in the wall of a spacer bore (e.g., where the nozzle wall component can include a plurality of spacer bores, each with a respective wall).

While the example nozzle wall component 300 of FIG. 7 shows the plurality of bores 320-1, 320-2 and 320-3 (e.g., spacer bores) with R1~144 degrees, R2~108 degrees and R3~108 degrees, such azimuthal spans may be substantially equal according to a formula R=360 degrees/Nsb, where Nsb is the number of spacer bores. For example, three spacer bores may be positioned with R1~R2~R2~120 degrees.

Figure 9:
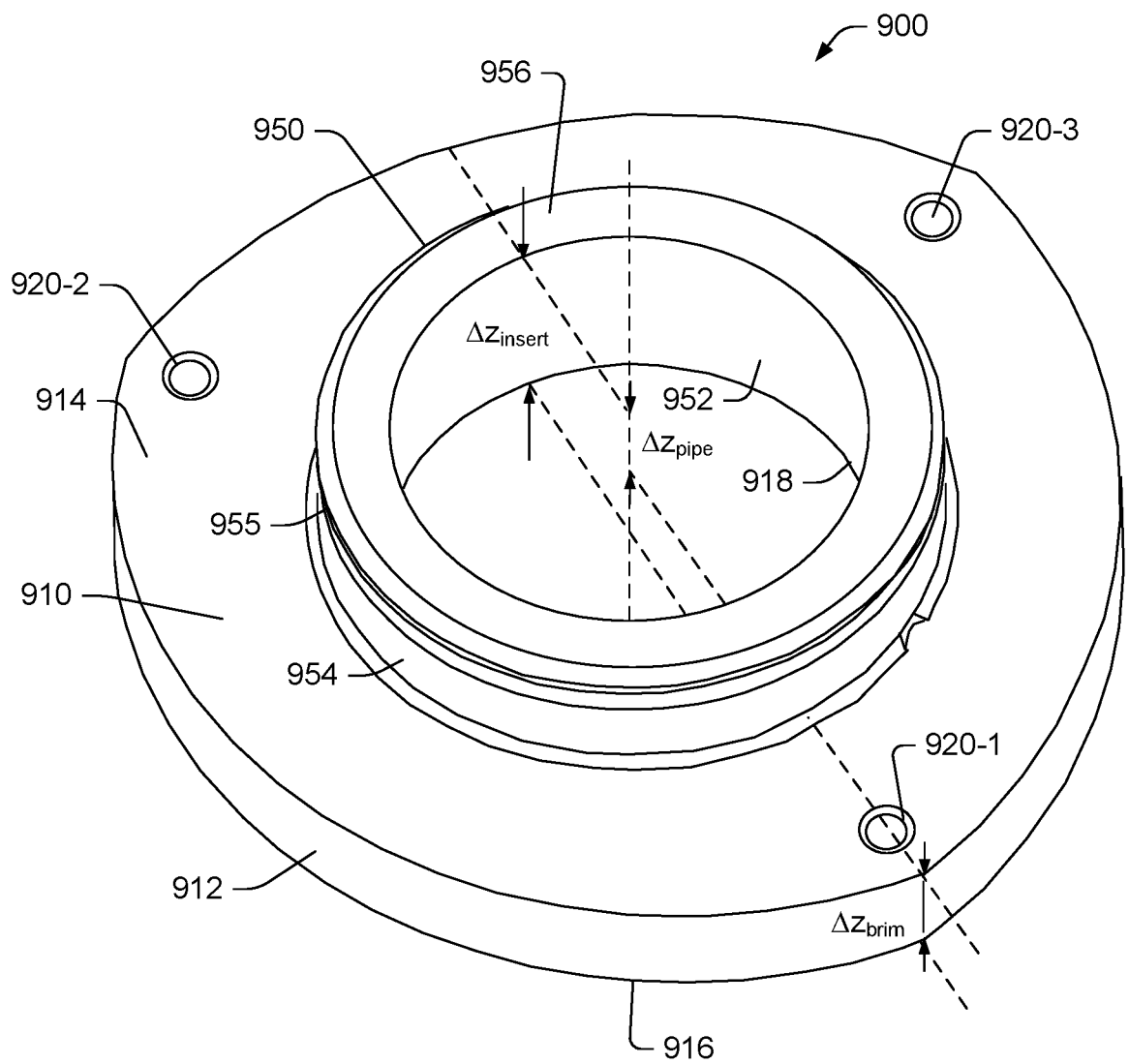
FIG. 9 is a perspective view of an example of a nozzle wall component that has a non-circular outer perimeter that is defined at least in part by intersecting arcs.

FIG. 9 shows an example of a nozzle wall component 900 that includes a plate portion 910 that has a shape that differs from the shape of the annular plate portion 310 of the nozzle wall component 300. The nozzle wall component 900 of FIG. 9 can be included in a turbocharger such as the turbocharger 120 of FIG. 1, the turbocharger 200 of FIG. 2, etc. (see also, e.g., the exploded view of FIG. 13).

In the example of FIG. 9, the nozzle wall component 900 includes a plate portion 910 and a cylindrical portion 950 where the plate portion 910 includes an outer surface 912, opposing surfaces 914 and 916, a shroud surface 918 that meets the surface 916, and bores 920-1, 920-2 and 920-3 (e.g., spacer bores) and where the cylindrical portion 950 includes an inner surface 952, an outer surface 954 with a groove 955 and an end surface 956 where the surfaces 952 and 954 meet at the end surface 956 and where the surface 952 meets the shroud surface 918. The groove 955, which may be optional, can be dimensioned to receive one or more seal elements (e.g., seal rings, etc.). As an example, the nozzle wall component 900 may be without the cylindrical portion 950 (see, e.g., FIG. 13).

In the example of FIG. 9, various axial dimensions are shown, including a brim dimension ($\Delta z_{brim}$), a pipe dimension ($\Delta z_{pipe}$) and an insert dimension ($\Delta z_{insert}$) where the insert dimension can be an overall axial height of the nozzle wall component 900 including the axial height of the plate portion 910 (e.g., brim) and portion 950 (e.g., a cylindrical pipe portion or "pipe"). The term "insert" may be utilized as the nozzle wall component is inserted at least partially in a space defined by a turbine housing.

In FIG. 9, the nozzle wall component 900 can have an outer perimeter that can be defined by the intersections of curves. For example, consider the intersections of three circles or the meeting of arcs. In the example of FIG. 9, the nozzle wall component 900 includes three arcs where adjacent arcs meet along each of three radial lines from a central axis to an axis of a respective one of the bores 920-1, 920-2 and 920-3 (e.g., spacer bores).

As an example, an outer perimeter of a nozzle wall component can include features of a curvilinear polygon, which may be a curvilinear polygon built up of circular arcs or other arcs (e.g., ellipse, etc.). As an example, an outer perimeter of a nozzle wall component can be a Reuleaux polygon. For example, consider a Reuleaux triangle.

Referring again to FIG. 7, as shown, a nozzle wall component can include bores that are not equally spaced. For example, in FIG. 7, the nozzle wall component 300 includes an angular span of approximately 144 degrees between the bore 320-1 and the bore 320-2 and an angular span of approximately 108 degrees between the bore 320-2 and 320-3. For example, a nozzle wall component can be defined in a cylindrical coordinate system with coordinates r, z and $\Theta$, where r is a radial dimension, z is an axial dimension and $\Theta$ is an azimuthal dimension (e.g., in radian, degrees, etc.). In such an example, the angular spans of approximately 144 degrees (R1) and 108 degrees (R2 and R3) can be azimuthal spans. As to the angular span between the bore 320-1 and the bore 320-3 (e.g., as measured from their respective bore axes), it can be approximately equal to 360 degrees-144 degrees-108 degrees, which is 108 degrees. The nozzle wall component 900 of FIG. 9 includes angular spans (e.g., azimuthal spans) between bores 920-1, 920-2 and 920-3 where one of the angular spans can differ from one or more of the other angular spans.

A variable nozzle turbine (VNT) or variable geometry turbine (VGT) cartridge can include a nozzle wall component that does not have a circular external diameter. As explained, a nozzle wall component and a plate component can define a nozzle where vanes disposed in the nozzle can define throats, which may be adjustable vanes that pivot about respective axes to regulate how exhaust flows from a scroll or volute to a turbine wheel space.

As explained, spacers can be utilized to axially space a nozzle wall component and a plate component. Spacers are in an exhaust flow region and hence can disturb exhaust flow. As shown, a spacer can be an obstacle to exhaust flow where exhaust has to flow around the spacer to generate a flow disturbance. As each spacer may generate a flow disturbance, the number of spacers may be kept to a minimum. As shown in various examples, three spacers are utilized, noting that more spacers may be utilized, however, with increased flow disturbance. As an example, a number of spacers may be between three and six, noting again that three spacers tend to disrupt flow less than four, five or six spacers. Additionally, the number of spacers may impact expansion and contraction of a nozzle wall component. For example, with three spacers, a nozzle wall component may be constrained at three points, while with four spacers, a nozzle wall component may be constrained at four points. An increased number of spacers may complicate one or more of expansion, contraction and deformation of a nozzle wall component.

As an example, consider a nozzle wall component spaced from a plate component by three spacers that are orbitally cold riveted both on the nozzle wall component and the plate component. In such an example, consider each of the nozzle wall component and the plate component as including three axial bores with diameters of approximately 6 mm, and where each of the three axial bores of the nozzle wall component can have an associated wall thickness dimension along a line from the inside wall of an axial bore to an outer surface of the nozzle wall component (e.g., wall thickness to outer perimeter).

The effects of thermal cycling as may be encountered during operation and non-operation of a turbocharger turbine assembly can be detrimental to a nozzle wall component with respect to its axial bores for spacers. For example, the thinnest part of a bore wall may crack, which can be demonstrated via numerical computer simulations that utilize finite element analysis.

The example nozzle wall component 900 of FIG. 9 can help to reduce risk of cracking of the thinnest part of a bore wall of a spacer bore (see, e.g., the bores 920-1, 920-2, and 920-3) by utilizing a shape for the nozzle wall component 900 that locally increases the bore wall thickness via utilization of an external perimeter contour, which may be a Reuleaux triangle or other type of arced polygon. As an example, an external perimeter as in the example of FIG. 9 may be referred to as a trilobite shape or trilobite perimeter, which can provide for local increases in bore wall thickness while adding minimally to flow disturbance as to exhaust flow in an operational turbine assembly of a turbocharger. Such an approach can reduce risk of cracking and hence act to increase longevity of a turbine assembly of a turbocharger with minimal impact to performance as associated with exhaust flow. Further, as cracking is a type of deformation or distortion that can alter the shape of a nozzle wall component, with potentially detrimental consequences as to vane controllability (e.g., sticking, etc.), the arced perimeter approach to local bore wall thickening can reduce risk of deformation or distortion issues for an operational turbine assembly of a turbocharger.

As an example, a nozzle wall component can be machined from a piece of material (e.g., a forged blank, etc.) where such machining can form an accurate shroud contour. Such machining may also be implemented to form a perimeter of the nozzle wall component as a number of intersecting arcs, which can be at least three intersecting arcs where intersections are proximate to respective spacer bores to thereby provide for a desired amount of local bore wall thickness that can reduce risk of cracking of such local bore walls. As an example, a machine that can form a circular perimeter may be utilized to form a number of arcs that intersect. As an example, an edge formed by two intersecting arcs may be machined such that the edge is smoothed. Such smoothing can round the edge such that flow disturbances during operation are reduced compared to a sharp edge. Further, such smoothing can help to reduce stress that may result from a sharp edge and/or physical and/or chemical effects (e.g., sites of attack, sites of penetration, etc.).

As an example, a nozzle wall component can include one or more chamfers and/or one or more fillets along an outer perimeter. For example, during machining of a nozzle wall component, intersecting arcs may be formed that meet at an edge, which may be referred to as a sharp edge. In such an example, a chamfer may be machined at the edge that makes two edges and/or one or more fillets may be machine at the edge and/or at the chamfer edges.

As an example, a chamfer and/or a fillet can give a part better flow and less resistance. Use of one or more fillets can reduce and/or eliminate one or more sharp edges, which may be damaged more readily upon contact with an object than a fillet and, for example, use of one or more fillets may help to reduce risk of injury during handling of the part. As to a reduction in risk of damage, such an approach can translate into higher throughput and inspection may be made more efficient as well. A fillet can help to lower one or more stress concentration factors as a fillet can help to distribute stress over a broader area. As an example, a nozzle wall component with one or more chamfers and/or one or more fillets may be more durable and able to withstand larger loads compared to the same part with sharp edges.

As an example, an outer perimeter of a nozzle wall component can be formed via forging where the outer contour is determined by forging, rather than machining. In such an example, machining may be utilized, for example, to form and/or hone spacer bores, reduce sharpness of one or more edges, refine a shroud contour, etc.

Figure 10:
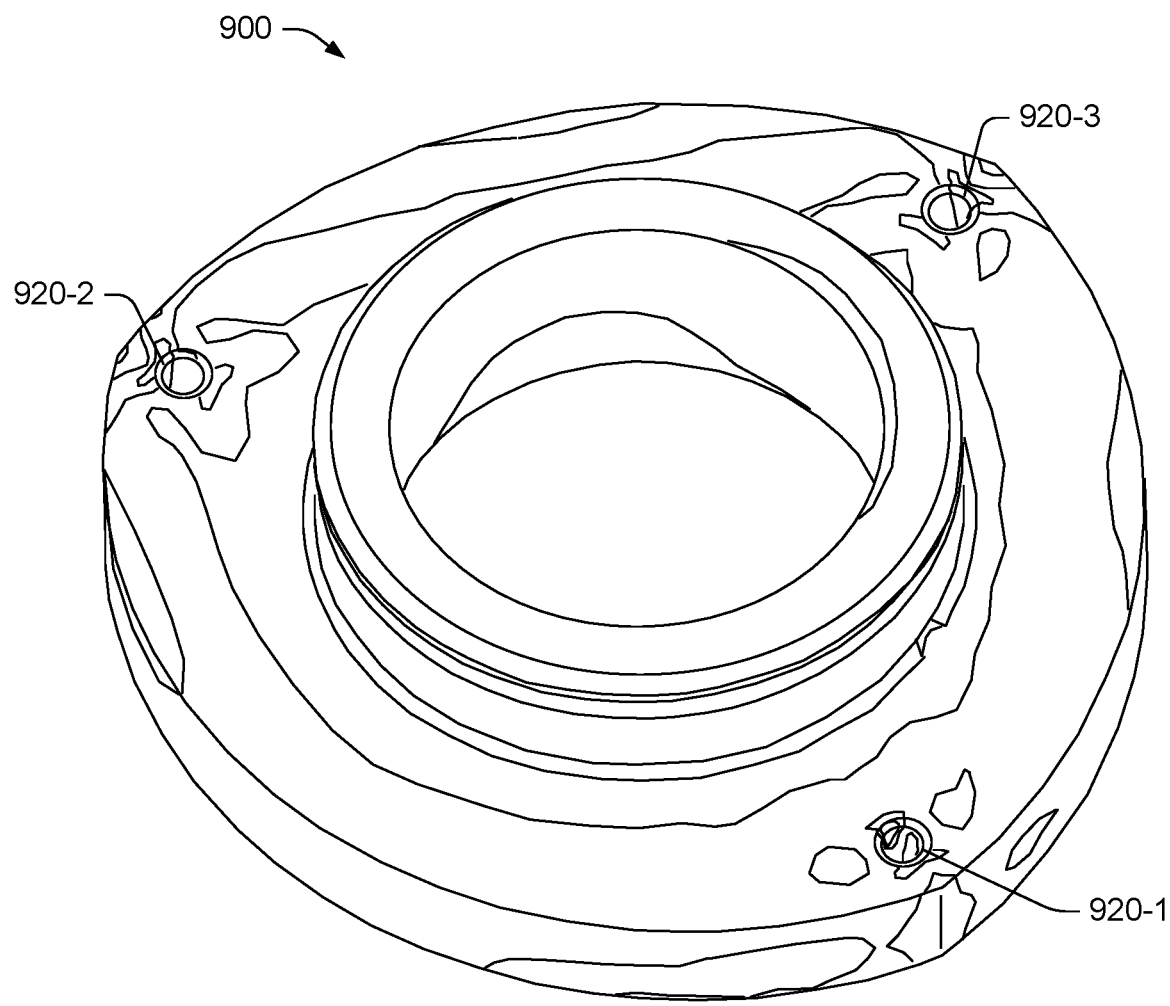
FIG. 10 is a perspective view of the nozzle wall component of FIG. 9 with physical property contour values from a finite element analysis.

FIG. 10 shows the nozzle wall component 900 of FIG. 9 with physical parameter contour values that correspond to cumulative plastic strain as determined by finite element analysis (FEA) simulations of the nozzle wall component 900 with respect to temperature. FIG. 10 shows the bores 920-1, 920-2 and 920-3, which are referred to below in Table 1 as spacer bores 1, 2 and 3 for the "arcs" or intersecting curves outer perimeter in comparison to the bores 320-1, 320-2 and 320-3, which are also referred to as spacer bores 1, 2 and 3 for the "circular" outer perimeter.

TABLE 1

| FEA Results (ANSYS simulation software results) | | | | |
|---|---|---|---|---|
| Spacer Bore | Circular | Circular | Arcs | Arcs |
| 1 | 100% | 9.24 | 38% | 3.54 |
| 2 | 90% | 8.34 | 41% | 3.79 |
| 3 | 67% | 6.2 | 27% | 2.49 |

As shown in Table 1, the cumulative plastic strain at each of the three spacer bores is reduced by at least 50% for the nozzle wall component with a perimeter formed with arcs (e.g., intersecting curves) compared to the nozzle wall component with a circular perimeter. Note that the percentage values are scaled where the spacer bore 1 of the circular outer perimeter nozzle wall component 900 has the highest cumulative plastic strain value of 9.24, which is scaled at 100% in the percentage column.

Figure 11:
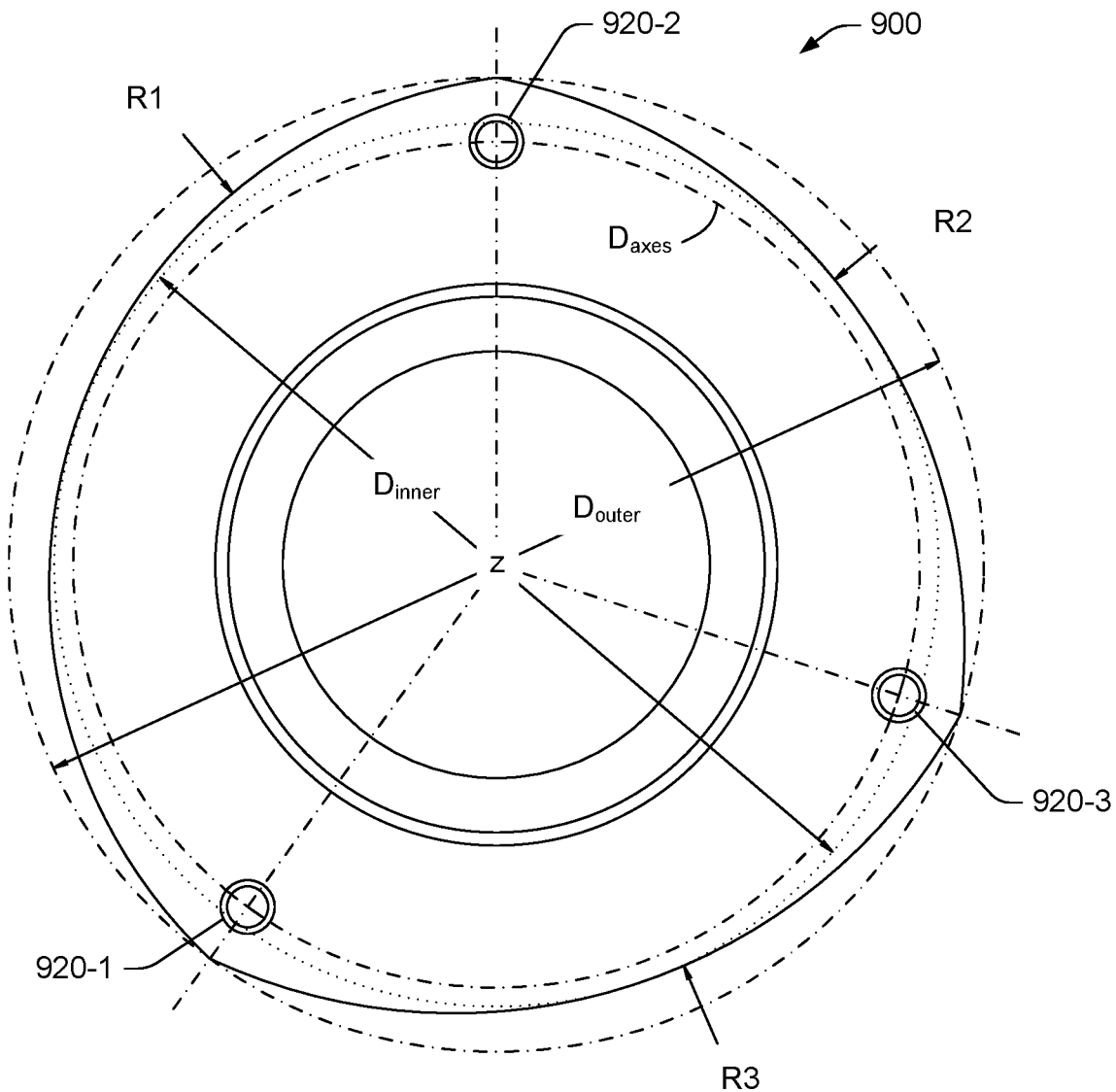
FIG. 11 is a plan view of the nozzle wall component of FIG. 9.

FIG. 11 shows a plan view of the nozzle wall component 900 along with various examples of dimensions, including an inscribed outer diameter ($D_{outer}$), an inscribed inner diameter ($D_{inner}$) and a bore axes diameter ($D_{axes}$). As an example, consider the nozzle wall component 900 as being inscribed in a circle with a diameter of approximately 76 mm ($D_{outer}$) where the inscription is defined by three intersection points by intersection of the three arcs that at least in part define the outer perimeter of the nozzle wall component 900. In such an example, each of the bores 920-1, 920-2 and 920-3 (e.g., spacer bores) may define a circle with a diameter of approximately 66 mm ($D_{axes}$). As such, a radial distance of approximately 5 mm exists from a spacer bore axis to the intersection point of two arcs (e.g., 0.5(76 mm-66 mm). If a circle is inscribed at the radially outermost point of each of the spacer bores, such a circle has a diameter of approximately 69 mm, which corresponds approximately to the inner diameter (e.g., $D_{inner}$). In such an example, the thinnest spacer bore wall thickness to the outer perimeter of the nozzle wall component 900 is approximately 3.5 mm (e.g., 0.5(76 mm-69 mm)). The same spacer bore wall thickness could be achieved using a circular outer perimeter with a diameter of 76 mm, however, such an approach would lead to an increase in detrimental thermal effects, as mentioned, and, for example, may lead to more mass.

In the example of FIG. 11, the arcs can include two 45 mm radius arcs and a 40 mm radius arc where the 40 mm radius arc is to the left in FIG. 11 (see, e.g., R1) and the 45 mm radius arcs are to the right, upper right and lower right (see, e.g., R2 and R3).

Figure 12:
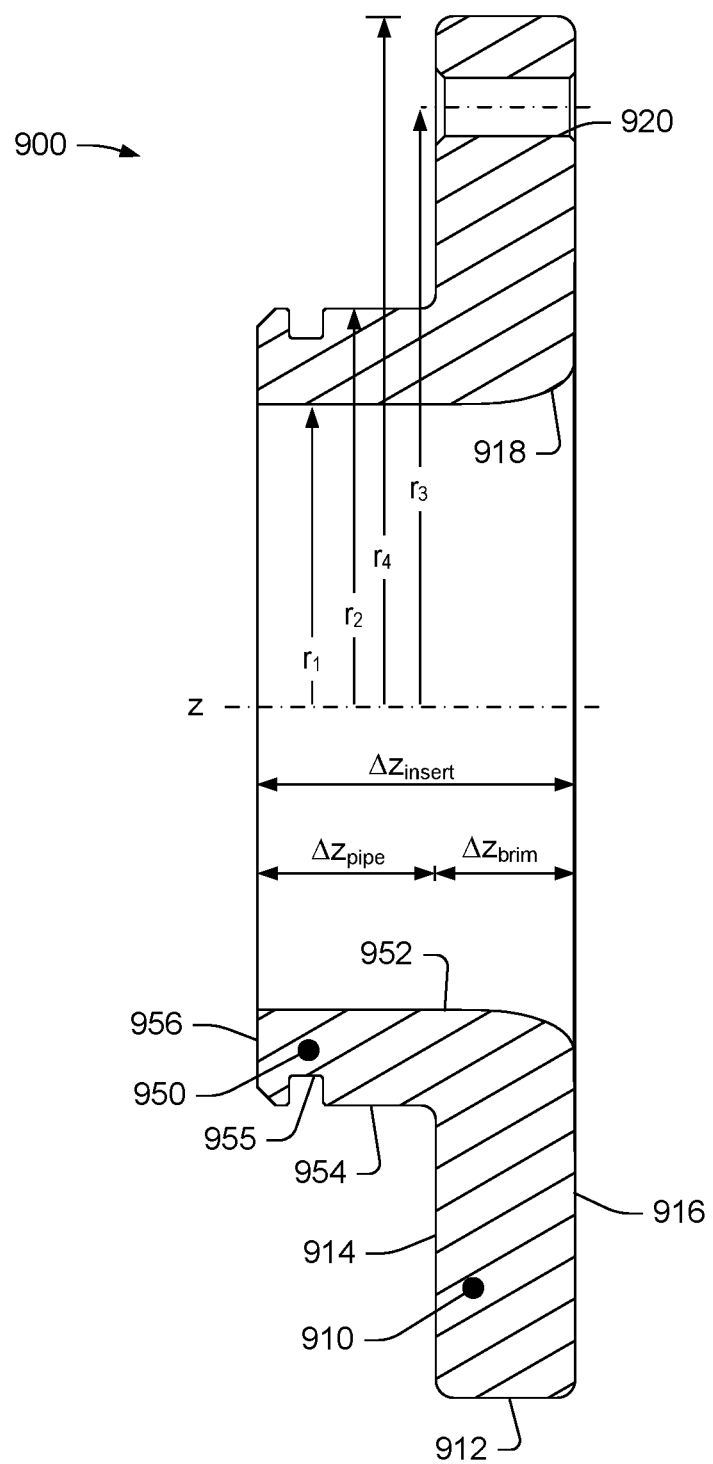
FIG. 12 is a cross-sectional view of the nozzle wall component of FIG. 9.

FIG. 12 shows a cross-sectional view of the nozzle wall component 900 along with various examples of dimensions, which include radial dimensions and axial dimensions (see also, e.g., the radial and axial dimensions of FIG. 4). As shown in FIG. 12, the nozzle wall component 900 can be defined by an axial dimension $\Delta z_{insert}$, which may be a sum of an axial brim dimension $\Delta z_{brim}$ and an axial pipe dimension $\Delta z_{pipe}$. Radial dimensions in the example of FIG. 12 include a radius $r_1$ from the central axis z (z-axis) to an inner surface 952 of the cylindrical portion 950 of the nozzle wall component 900 that defines in part a turbine wheel space, a radius $r_2$ from the central axis z to an outer surface 954 of the cylindrical portion 950 of the nozzle wall component 900, a radius $r_3$ from the central axis z to the axis of the bore 920 (e.g., parallel to the central z axis), and a radius $r_4$ from the central axis z to an outer perimeter of the plate portion 910 of the nozzle wall component 900 at the surface 912 where the plate portion 910 of the nozzle wall component 900 includes a portion that is between $r_2$ and $r_4$ and where the plate portion may be referred to as a brim portion, which is shown as including the shroud surface 918 that defines, in part, a turbine wheel space for a turbine that can be aligned on a shaft supported by a bearing in a bore of a center housing where the rotational axis of the turbine wheel and the shaft are substantially aligned with the z-axis shown in FIG. 12 (e.g., a central axis of the nozzle wall component 900).

Figure 13:
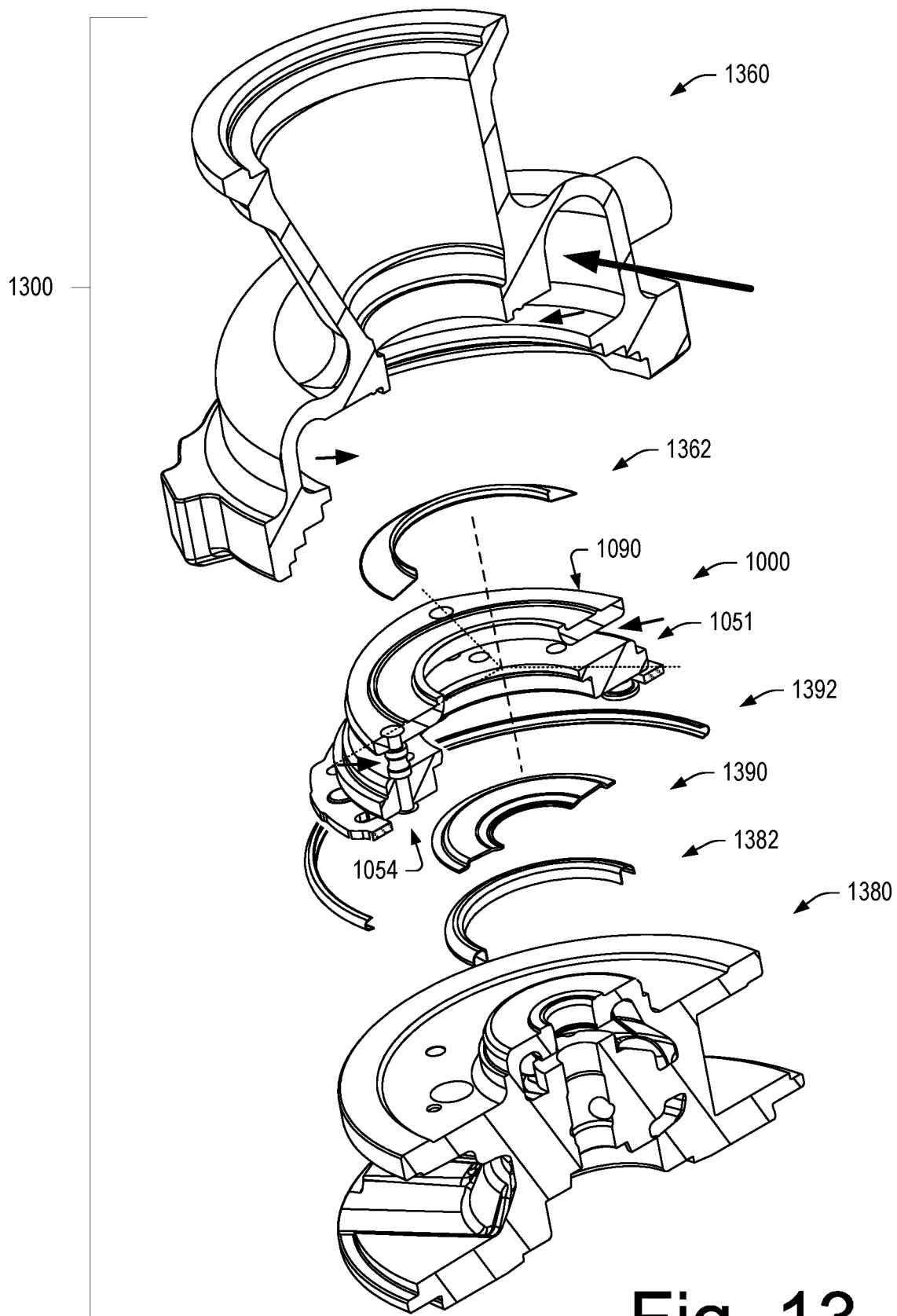
FIG. 13 is an exploded view of an example of a turbine assembly that includes an example of a nozzle wall component.

FIG. 13 shows an exploded cutaway view of an assembly 1300 that includes the seal 1362, a cartridge 1000, a turbine housing 1360, a center housing 1380, a component 1382, a component 1390 and a component 1392. A common axis (z-axis) is shown, which is a longitudinal axis of a bore of the center housing 1380 and a central axis of the cartridge 1000. As an example, the component 1390 may contact the cartridge 1000 where the component 1390 may have a spring constant (e.g., be elastically deformable). As an example, when assembled, the cartridge 1000 may be axially biased between the center housing 1380 and the turbine housing 1360 via the component 1390 (e.g., a heat shield) and the seal 1362. As an example, the turbine housing 1360 may be clamped to the center housing 1380 such that a gapless interface is formed therebetween. For example, the turbine housing 1360 may be coupled and axially fixed to the center housing 1380. As an example, the component 1390 may exert a force (e.g., a load) to the cartridge 1000 that is reacted by the turbine housing 1360. As an example, the seal 1362 may be more flexible than that the component 1390 such that the seal 1362 compresses (e.g., achieves a compressed state) when subject to loading in an assembled state of the assembly 1300 (e.g., at least in part via force exerted by the component 1390). As an example, the seal 1362 may be elastically deformable, for example, to be compressed to a compressed state in an assembly and to return to an uncompressed state upon disassembly of the assembly (e.g., removal of the seal 1362 from the assembly).

In the example of FIG. 13, the cartridge 1000 includes a nozzle wall component 1090 that does not include a cylindrical portion. As shown, the nozzle wall component 1090 includes an outer perimeter formed of a plurality of arcs that intersect to locally increase wall thickness at each of a plurality of spacer bores. As shown in FIG. 13, the cartridge 1000 includes a plate component 1051 and spacers 1054 that define a nozzle space axial dimension between the nozzle wall component 1090 and the plate component 1051, as between facings surfaces thereof (e.g., a lower surface of the nozzle wall component 1090 and an upper surface of the plate component 1051).

As may be appreciated, the outer perimeter of the nozzle wall component 1090 is received in the turbine housing 1360 such that the outer perimeter is disposed in the volute where exhaust flows. As such, the shape of the outer perimeter can affect exhaust flow.

Figure 14A:
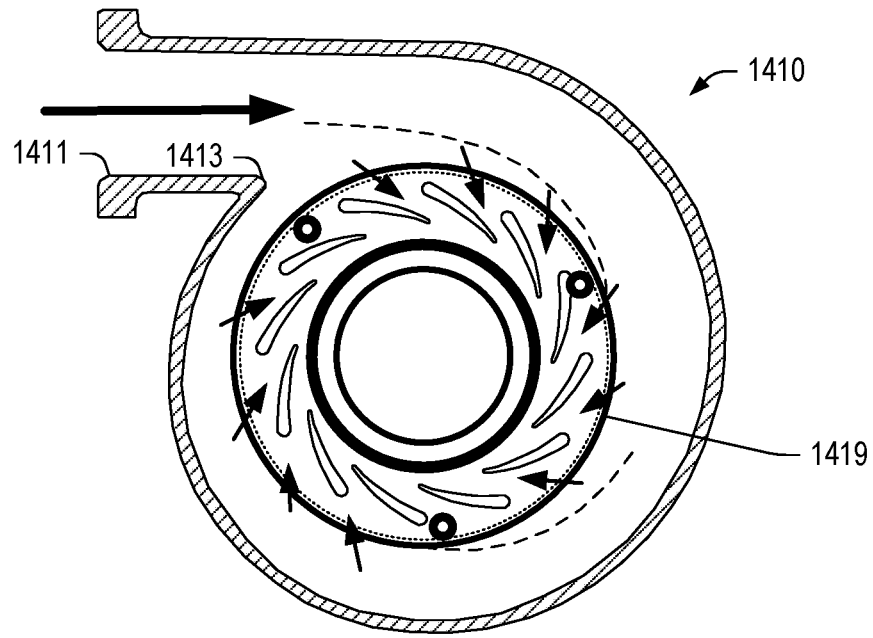
FIG. 14A and FIG. 14B show an approximate view of flow about a nozzle wall component that has a circular outer perimeter and an approximate view of flow about a nozzle wall component that has a non-circular outer perimeter, respectively.
Figure 14B:
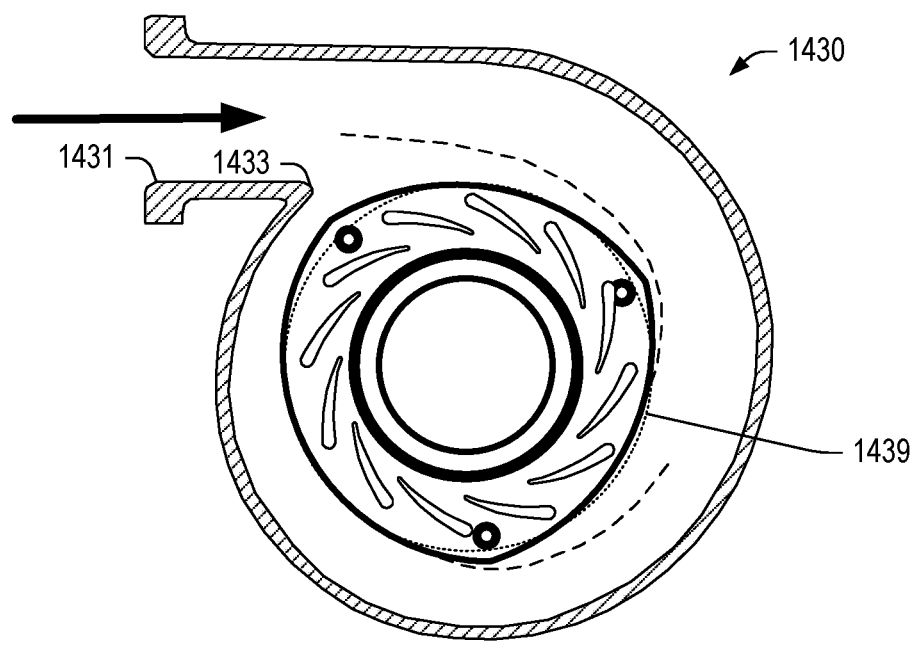

FIG. 14A and FIG. 14B show an example of a turbine assembly 1410 with a nozzle wall component 1419 with a circular outer perimeter and an example of a turbine assembly 1430 with a nozzle wall component 1439 with an outer perimeter formed by intersecting arcs, respectively. In the examples of FIGS. 14A and 14B, the turbine assembly 1410 includes a turbine housing with an exhaust inlet 1411 and a tongue 1413 that is at a transition from an inlet portion to a volute portion and the turbine assembly 1430 includes a turbine housing with an exhaust inlet 1431 and a tongue 1433 that is at a transition from an inlet portion to a volute portion. As shown, flow in a volute may be disturbed to some extent where arcs intersect, which, as mentioned, may be smoothed via one or more of fillet(s) and chamfer(s). For example, exhaust flow may deviate slightly along a streamline near an intersection point or intersection region. In terms of a performance impact, computational fluid dynamic simulations indicate that the amount of impact from the intersecting arcs outer perimeter versus the circular outer perimeter is minimal. For exhaust velocities of the order of approximately 240 meters per second in the volute, the effect on mass velocity is about 9 grams per second.

As mentioned, one type of curved polygon is a Reuleaux triangle. As to a Reuleaux triangle, it can be defined as a curve of constant width constructed by drawing arcs from each polygon vertex of an equilateral triangle between the other two vertices. The Reuleaux triangle has the smallest area for a given width of any curve of constant width. Let the arc radius be r and since the area of each meniscus-shaped portion of the Reuleaux triangle is a circular segment with opening angle $\theta=\pi/3$ and area $A_s$ and the area of the central equilateral triangle can be defined with a=r, as $A_t$, consider the following equations for the total area A:

$$A_s = \frac{1}{2}r^2(\theta - \sin\theta) = \left(\frac{\pi}{6} - \frac{\sqrt{3}}{4}\right)r^2$$

$$A_t = \frac{1}{4}\sqrt{3}\,r^2$$

$$A = 3A_s + A_t = \frac{1}{2}(\pi - \sqrt{3})r^2$$

Per the foregoing equations, three times the equal areas ($A_s$) and the area of the central equilateral triangle ($A_t$) define the total area (A). The total area of a nozzle wall component with curved perimeter sections and the total area of a nozzle wall component with a circular perimeter may be compared.

Figure 15:
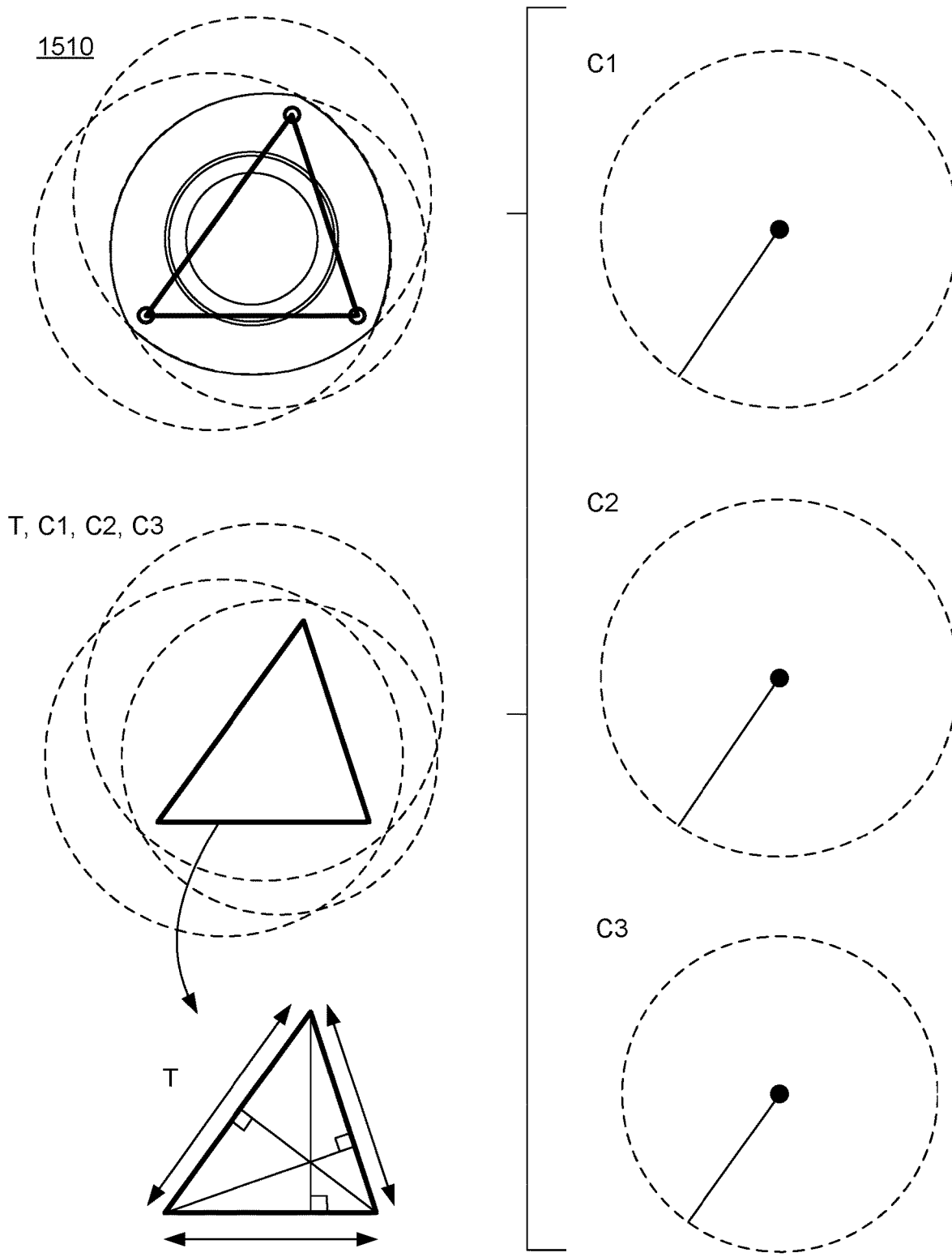
FIG. 15 is a series of geometric shapes with respect to an example of a nozzle wall component such as the nozzle wall component of FIG. 9.

FIG. 15 shows an example of a nozzle wall component 1510 along with a triangle (T) and three curves (C1, C2 and C3) where portions of each of the curves (C1, C2 and C3) define an outer perimeter of the nozzle wall component 1510. As shown, the outer perimeter is formed from three arcs, which are arcs of circles where two of the circles have the same diameter (i.e., the same radius) and where the other circle has a smaller diameter (i.e., a smaller radius). As shown, the spacer bores can form vertexes of the triangle (T), however, in the example of FIG. 15, the triangle is not an equilateral triangle, though it is an isosceles triangle as it has two lengths that are equal (e.g., substantially equal). As shown, the arcs intersect at points that can define a larger triangle where the vertices between the triangles can define a bore axis to outer perimeter difference, which includes a spacer bore wall thickness.

Figure 16:
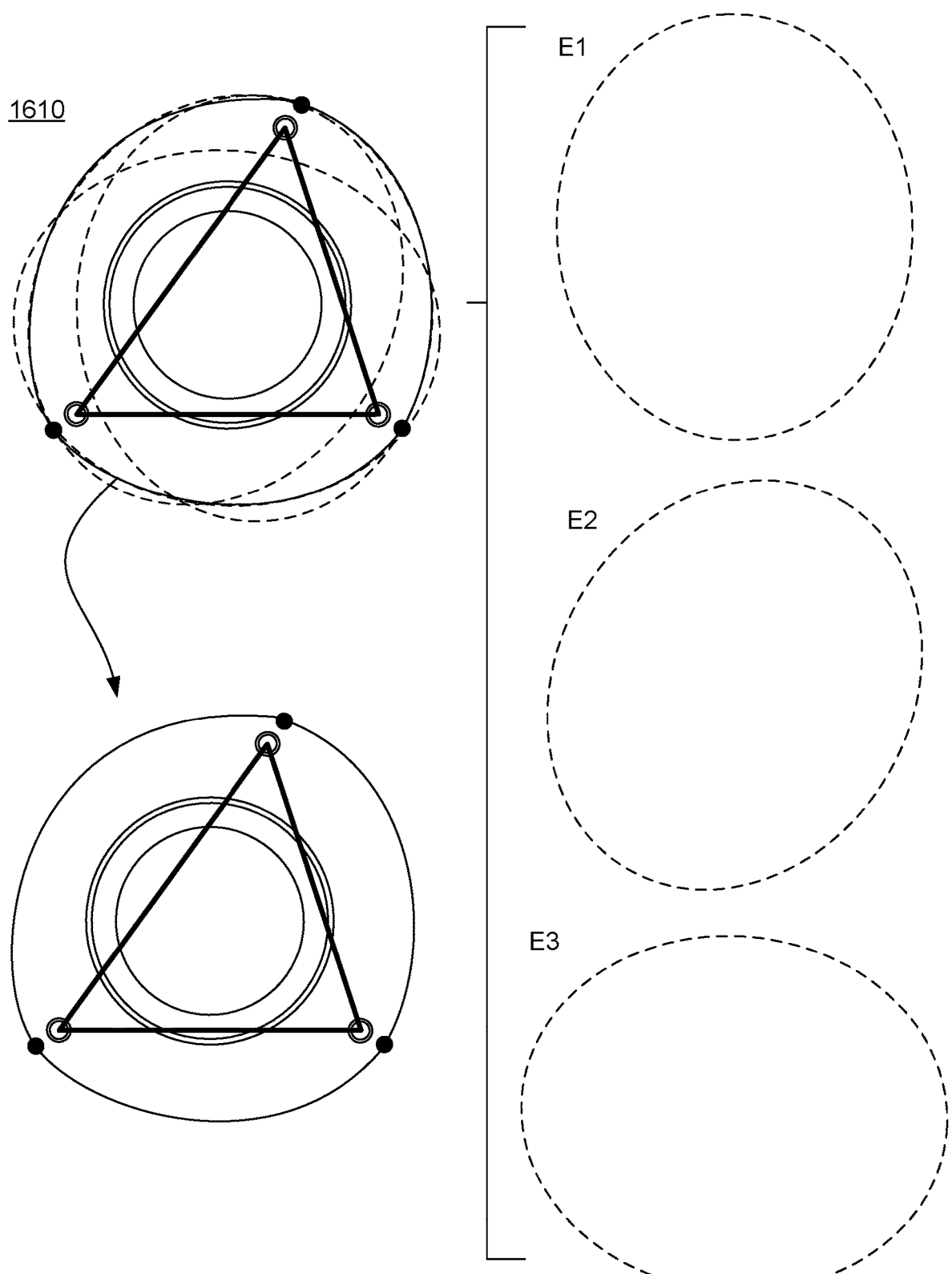
FIG. 16 is a series of geometric shapes with respect to an example of a nozzle wall component with a non-circular outer perimeter.

FIG. 16 shows an example of a nozzle wall component 1610 where a composite view shows where arcs of three ellipses (E1, E2 and E3) can form an outer perimeter of a nozzle wall component. As mentioned, a nozzle wall component can be formed or defined at least in part by intersecting arcs. In the example of FIG. 16, the intersecting arcs are arcs of portions of the ellipses (E1, E2 and E3), which are the same as to their loci, major axis and minor axis. Note that in the example of FIG. 16, the shape of the outer perimeter of the nozzle wall component 1610 is not defined by an area formed by intersection of all three ellipses, which means that the example shown differs from the area formed, for example, in a Reuleaux triangle.

Figure 17:
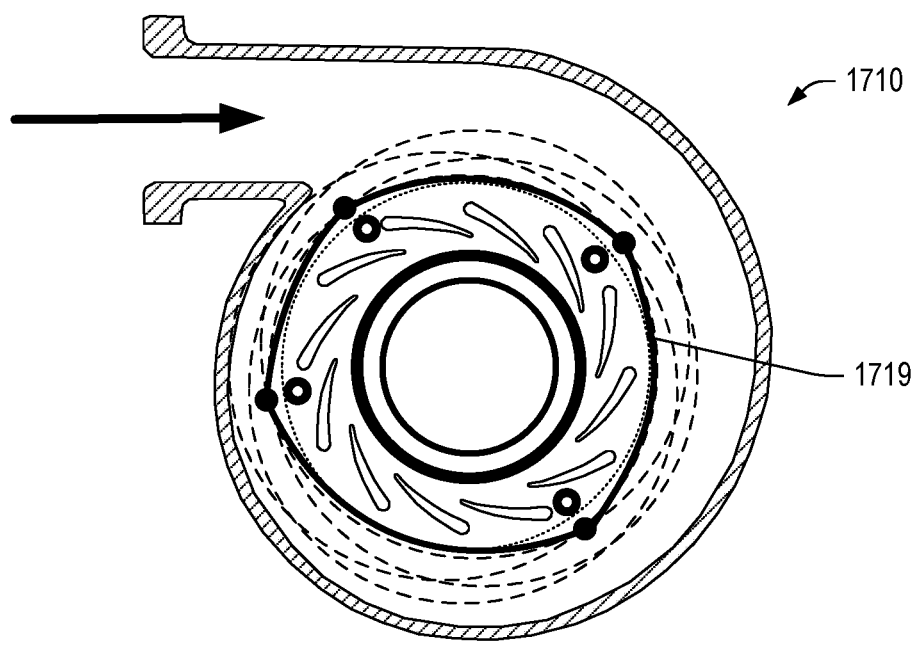
FIG. 17 is a series of approximate views of an example of a turbine assembly with an example of a nozzle wall component that includes more than three spacers.

FIG. 17 shows a plan view of an example of a turbine assembly 1710 that includes a nozzle wall component 1719 with four spacers and hence four spacer bores where the outer perimeter of the nozzle wall component includes four arcs where adjacent arcs intersect and where the arcs may be circular arcs.

One or more features of the nozzle wall components 1090 of FIG. 13, 1439 of FIG. 14, 1510 of FIG. 15, 1610 of FIG. 16, or 1719 of FIG. 17 can be included in a nozzle wall component in a turbocharger such as, for example, one of the turbocharger 120 of FIG. 1, the turbocharger 200 of FIG. 2, the assembly 1300 of FIG. 13, etc. As explained, a non-circular outer perimeter that can be defined in part by intersecting curves can reduce thermal effects as associated with deformation, which can thereby improve integrity of a nozzle wall component in a turbine assembly of a turbocharger, for example, with respect to one or more forces that may be experienced during operation or during non-operation (e.g., consider temperature cycling between operation and non-operation, where temperatures may range from below 0 degrees C. to hundreds of degrees C. or more).

As an example, a minimum axial distance between a plate component and a nozzle wall component as defined by at least one spacer can be greater than a maximum vane height of the vanes. In such an example, the risk of a vane contact (e.g., and being damaged, bound, etc.) can be reduced through use of an outer perimeter of the nozzle wall component that can be defined at least in part via intersecting arcs that act to locally increase spacer bore wall thickness.

As an example, a turbocharger such as the turbocharger 200 of FIG. 2 can include a center housing (see, e.g., the center housing 280); a bearing (see, e.g., the bearing 230) disposed in a through bore of the center housing where the through bore of the center housing defines a longitudinal axis; a shaft (see, e.g., the shaft 220) rotatably supported by the bearing; a compressor wheel (see, e.g., the compressor wheel 244) operatively coupled to the shaft; a turbine wheel (see, e.g., the turbine wheel 264) operatively coupled to the shaft; and a turbine housing assembly (see, e.g., the turbine housing assembly 260) operatively coupled to the center housing where the turbine housing assembly includes a turbine housing (see, e.g., the turbine housing 262); and a cartridge (see, e.g., the cartridge 250) that includes a nozzle wall component (see, e.g., the nozzle wall component 900, the nozzle wall component 1090, the nozzle wall component 1439, the nozzle wall component 1510, the nozzle wall component 1610, the nozzle wall component 1719, etc.) and a plate component (see, e.g., the plate component 251, the plate component 1051, etc.) that are spaced axially by spacers (see, e.g., the spacers 254, the spacers 1054, etc.), where the nozzle wall component includes spacer bores (see, e.g., the spacer bores 920) for the spacers and where the nozzle wall component includes a non-circular outer perimeter defined at least in part by arcs where adjacent arcs intersect at intersection points, and where each of the intersection points is radially outwardly from a respective one of the spacer bores.

As an example, a turbocharger can include a center housing; a bearing disposed in a through bore of the center housing where the through bore of the center housing defines a longitudinal axis; a shaft rotatably supported by the bearing; a compressor wheel operatively coupled to the shaft; a turbine wheel operatively coupled to the shaft; and a turbine housing assembly operatively coupled to the center housing where the turbine housing assembly includes a turbine housing; and a cartridge that includes a nozzle wall component and a plate component that are spaced axially by spacers, where the nozzle wall component includes spacer bores for the spacers and where the nozzle wall component has a non-circular outer perimeter defined at least in part by arcs where adjacent arcs intersect at intersection points, and where each of the intersection points is radially outwardly from a respective one of the spacer bores. In such an example, the plate component can include a corresponding number of spacer bores where the spacers extend axially between the plate component and the nozzle wall component.

As an example, spacers may be fixed via deforming one or more end portions of one or more opposing ends of each of the spacers. Each spacer can include a nozzle portion that can include opposing shoulders that define a nozzle axial dimension. For example, FIGS. 4, 5, 6 and 13 show spacers that include opposing shoulders where one shoulder abuts a nozzle wall component and the other shoulder abuts a plate component, which may be an annular plate component.

As an example, a cartridge can include three spacers. As an example, a nozzle wall component can include three spacer bores. As an example, a nozzle wall component can be formed by forging where, for example, the nozzle wall component includes a shroud contour formed at least in part by machining where the shroud contour can be a turbine wheel shroud contour of a turbine wheel spaced defined at least in part by a portion of the nozzle wall component. As an example, a nozzle wall component can define in part a nozzle space and can in part define a turbine wheel space. As an example, a nozzle wall component can extend in part into a volute space of an exhaust gas volute defined in part by a turbine housing. As an example, spacer bores of a nozzle wall component can be formed at least in part by machining.

As an example, each of a plurality of spacer bores of a nozzle wall component can include an axis where the axes of the spacer bores define a triangle. In such an example, the triangle can be an isosceles triangle or, for example, another type of triangle. As an example, a triangle may be an equilateral triangle.

As an example, a cartridge can include vanes disposed between a plate component and a nozzle wall component. As an example, such vanes can be static (non-pivoting or non-adjustable) or can be dynamic (e.g., pivoting or adjustable).

As an example, an outer perimeter of a nozzle wall component can include at least one chamfer and/or at least one fillet. In such an example, a chamfer and/or a fillet may be disposed in a volute space defined in part by a turbine housing. In such an example, the chamfer and/or the fillet may help to reduce disturbances as to flow of exhaust gas from the volute space to a nozzle (e.g., or throats between adjacent vanes) and to a turbine wheel space.

As an example, a nozzle wall component can be disposed at least in part in a turbine housing to define at least a portion of an exhaust volute (e.g., an exhaust gas volute). During operation, exhaust can include heat energy that can be absorbed in part by a nozzle wall component where the nozzle wall component can increase in temperature and expand according to a coefficient of thermal expansion for the material of the nozzle wall component. Thermal expansion refers to the tendency of matter to change in shape, area, and volume in response to a change in temperature. Temperature tends to be a monotonic function of the average molecular kinetic energy of a substance. When a substance is heated, the kinetic energy of its molecules increases. Thus, the molecules begin vibrating/moving more and usually maintain a greater average separation. Materials that contract with increasing temperature may be considered to be unusual where such an effect tends to be limited in size and to occur within limited temperature ranges. Relative expansion (e.g., strain) divided by the change in temperature can be referred to as a material's coefficient of thermal expansion, which can vary with temperature.

As an example, a material such as INCONEL® 718 alloy can have a coefficient of thermal expansion that ranges from about $12.8 \times 10^{-6}$/degrees C. (e.g., 25 degrees C. to about 93 degrees C.) to about $16 \times 10^{-6}$/degrees C. (25 degrees C. to 760 degrees C.). Such material has a melting temperature in a range of about 1210 degrees C. to about 1344 degrees C. Such material has a density of about 8220 kg per cubic meter.

Referring to FIGS. 8 and 10, such material characteristics may be taken into account for one or more of material selection, material processing to form a component, material weight, material deformation, material integrity as utilized in a turbine assembly, etc. As to mass, volume may be calculated to determine a mass using a specified density. As an example, volume and/or mass may be determined for a nozzle wall component with a circular perimeter and a nozzle wall component with a non-circular perimeter. As an example, when determining thermal effects, consideration of constraint and non-constraint may be taken into account. For example, a component that is physically constrained can deform differently than a component that is not physically constrained. As an example, where a nozzle wall component is constrained via one or more spacers (e.g., radially, axially and/or azimuthally), such constraint(s) may be taken into account with respect to the shape of the outer perimeter of the nozzle wall component where the shape can be beneficially non-circular where feature(s) of the shape can correspond to location(s) of such constraint(s).

As an example, a turbine housing can include a wall that defines at least in part a volute where the wall includes a tongue. In such an example, one of the spacers can be positioned proximate to the tongue. In such an example, an azimuthal span from the spacer positioned proximate to the tongue and one of the spacers that is an adjacent spacer in a counter-clockwise or clockwise direction can differ from an azimuthal span from the spacer positioned proximate to the tongue and another one of the spacers that is an adjacent spacer in a clockwise or counter-clockwise direction, respectively (i.e., counter-clockwise paired with clockwise or clockwise paired with counter-clockwise). In such an example, the sum of the azimuthal spans is greater than approximately 240 degrees.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger comprising:
a center housing;
a bearing disposed in a through bore of the center housing wherein the through bore of the center housing defines a longitudinal axis;
a shaft rotatably supported by the bearing;
a compressor wheel operatively coupled to the shaft;
a turbine wheel operatively coupled to the shaft; and
a turbine housing assembly operatively coupled to the center housing wherein the turbine housing assembly comprises:
a turbine housing; and
a cartridge that comprises a nozzle wall component and a plate component that are spaced axially by spacers, wherein the nozzle wall component comprises spacer bores for the spacers and wherein the nozzle wall component comprises a non-circular outer perimeter defined at least in part by arcs where adjacent arcs intersect at intersection points, and wherein each of the intersection points is radially outwardly from a respective one of the spacer bores.

2. The turbocharger of claim 1 wherein the cartridge comprises three spacers.

3. The turbocharger of claim 1 wherein the nozzle wall component comprises three spacer bores.

4. The turbocharger of claim 1 wherein the nozzle wall component is formed by forging.

5. The turbocharger of claim 4 wherein the nozzle wall component comprises a shroud contour formed at least in part by machining.

6. The turbocharger of claim 4 wherein the spacer bores are formed at least in part by machining.

7. The turbocharger of claim 1 wherein each of the spacer bores comprises an axis and wherein the axes of the spacer bores define a triangle.

8. The turbocharger of claim 7 wherein the triangle is an isosceles triangle.

9. The turbocharger of claim 1 wherein the cartridge comprises vanes disposed between the plate component and the nozzle wall component.

10. The turbocharger of claim 1 wherein the outer perimeter of the nozzle wall component comprises at least one chamfer.

11. The turbocharger of claim 1 wherein the outer perimeter of the nozzle wall component comprises at least one fillet.

12. The turbocharger of claim 1 wherein the nozzle wall component is disposed at least in part in the turbine housing to define at least a portion of an exhaust volute.

13. The turbocharger of claim 1 wherein the turbine housing comprises a wall that defines at least in part a volute wherein the wall comprises a tongue.

14. The turbocharger of claim 13 wherein one of the spacers is positioned proximate to the tongue.

15. The turbocharger of claim 14 wherein an azimuthal span from the spacer positioned proximate to the tongue and one of the spacers that is an adjacent spacer in a counter-clockwise or clockwise direction differs from an azimuthal span from the spacer positioned proximate to the tongue and another one of the spacers that is an adjacent spacer in a clockwise or counter-clockwise direction.

16. The turbocharger of claim 15 wherein the sum of the azimuthal spans is greater than approximately 240 degrees.

\* \* \* \* \*